US007307665B2

(12) United States Patent
Opshaug et al.

(10) Patent No.: US 7,307,665 B2
(45) Date of Patent: Dec. 11, 2007

(54) METHOD AND SYSTEM FOR GENERATING REFERENCE SIGNALS WITH IMPROVED CORRELATION CHARACTERISTICS FOR ACCURATE TIME OF ARRIVAL OR POSITION DETERMINATION

(75) Inventors: Guttorm Ringstad Opshaug, Menlo Park, CA (US); Matthew Rabinowitz, Los Altos Hills, CA (US); Jimmy K. Omura, San Francisco, CA (US)

(73) Assignee: Rosum Corporation, Mountail View, CA (US)

( * ) Notice: Subject to any disclaimer, the term of this patent is extended or adjusted under 35 U.S.C. 154(b) by 624 days.

(21) Appl. No.: 10/740,881

(22) Filed: Dec. 22, 2003

(65) Prior Publication Data
US 2004/0165066 A1    Aug. 26, 2004

Related U.S. Application Data

(60) Provisional application No. 60/449,625, filed on Feb. 24, 2003.

(51) Int. Cl.
H04N 7/00    (2006.01)
H04N 7/04    (2006.01)
H04N 11/00    (2006.01)
G01S 3/02    (2006.01)

(52) U.S. Cl. ............... 348/470; 348/461; 348/466; 348/473; 348/607; 348/724; 348/725; 342/463; 701/207; 701/213

(58) Field of Classification Search .......... 348/470, 348/473, 461, 466, 607, 614, 725, 723, 724
See application file for complete search history.

(56) References Cited

U.S. PATENT DOCUMENTS

| | | | | |
|---|---|---|---|---|
| 6,522,297 | B1 * | 2/2003 | Rabinowitz et al. | 342/458 |
| 6,559,800 | B2 * | 5/2003 | Rabinowitz et al. | 342/457 |
| 6,717,547 | B2 * | 4/2004 | Spilker et al. | 342/464 |
| 6,727,847 | B2 * | 4/2004 | Rabinowitz et al. | 342/357.06 |
| 6,753,812 | B2 * | 6/2004 | Rabinowitz et al. | 342/464 |
| 6,839,024 | B2 * | 1/2005 | Spilker, Jr. et al. | 342/386 |
| 6,859,173 | B2 * | 2/2005 | Spilker, Jr. et al. | 342/464 |
| 6,861,984 | B2 * | 3/2005 | Rabinowitz et al. | 342/464 |
| 6,879,286 | B2 * | 4/2005 | Rabinowitz et al. | 342/458 |
| 6,963,306 | B2 * | 11/2005 | Spilker, Jr. | 342/464 |
| 7,126,536 | B2 * | 10/2006 | Rabinowitz et al. | 342/464 |
| 2004/0201729 | A1 * | 10/2004 | Poplin et al. | 348/226.1 |
| 2005/0015162 | A1 * | 1/2005 | Omura et al. | 700/94 |
| 2005/0030229 | A1 * | 2/2005 | Spilker, Jr. | 342/385 |
| 2005/0117070 | A1 * | 6/2005 | Wu et al. | 348/725 |

* cited by examiner

Primary Examiner—Brian P. Yenke
(74) Attorney, Agent, or Firm—McDermott Will & Emery LLP

(57) ABSTRACT

The present invention provides a method and system for generating reference signals that, when correlated with synchronization code signals or other components of broadcast TV signals, yield minimal sidelobes, produce large main peaks, and have minimal couplings to high frequency noise and low frequency disturbance signals. The present invention also provides a method and system for accurate position determination utilizing broadcast TV signals by employing reference signals with improved correlation characteristics of minimal sidelobes, minimal coupling to high frequency noise, minimal coupling to low frequency disturbance signals and a maximal main correlation peak.

41 Claims, 22 Drawing Sheets

Seven-tone Multiburst Test Signal

Autocorrelation function of the Seven-tone Multiburst Test Signal

Reference signal for the seven-tone multiburst test signal generated by a Quadratic Programming (QP) method to reduce the sidelobes.

Cross-correlation of the seven-tone multiburst test signal with the reference signal created from the QP optimization.

The seven-tone multiburst in the presence of AWGN with the noise power twice that of the signal power.

Cross-correlation between the seven-tone multiburst in the presence of AWGN and the reference signal created from the QP optimization.

Cross-correlation between the seven-tone multiburst in the presence of AWGN with the reference signal created by the constrained QP optimization with $\lambda=10$.

METHOD AND SYSTEM FOR GENERATING REFERENCE SIGNALS WITH IMPROVED CORRELATION CHARACTERISTICS FOR ACCURATE TIME OF ARRIVAL OR POSITION DETERMINATION

CROSS-REFERENCES TO RELATED APPLICATIONS

The present application claims the benefit of priority under 35 U.S.C. §119 from U.S. Provisional Patent Application Ser. No. 60/449,625, entitled "Reducing Sidelobes on the Synch Signal Correlation Output," filed on Feb. 24, 2003, which is hereby incorporated by reference in its entirety for all purposes.

This application claims the benefit of U.S. Provisional Patent Application Ser. No. 60/361,762, "DTV Position Location Augmented by GPS," by James J. Spilker, filed Mar. 4, 2002; U.S. Provisional Patent Application Ser. No. 60/341,922, "An Inexpensive Hardware and Signal Processing Technique for Tracking Television Signals in a Mobile Handheld Device," by Matthew Rabinowitz, filed on Dec. 18, 2001; U.S. Provisional Patent Application Ser. No. 60/353,440, "DTV Position Location Augmented by GPS," by James J. Spilker, filed Feb. 1, 2002; U.S. Provisional Patent Application Ser. No. 60/332,504 "DTV Augmented GPS for Robust Aircraft Navigation," by James J. Spilker, filed Nov. 13, 2001, the disclosures thereof are incorporated by reference herein in their entirety.

This application is related to U.S. Non-provisional Patent Application Ser. No. 10/003,128, "Robust Data Transmission Using Broadcast Digital Television Signals," by James K. Omura, James J. Spilker, Jr. and Matthew Rabinowitz, filed Nov. 14, 2001; U.S. Non-provisional Patent Application Ser. No. 09/887,158, "Position Location using Broadcast Digital Television Signals," by James J. Spilker and Matthew Rabinowitz, filed Jun. 21, 2001; U.S. Non-provisional Patent Application Ser. No. 09/932,010, "Position Location using Terrestrial Digital Video Broadcast Television Signals," by James J. Spilker and Matthew Rabinowitz, filed Aug. 17, 2001; U.S. Non-provisional Patent Applications Ser. No. 10/054,302, "Position Location using Broadcast Analog Television Signals," by James J. Spilker and Matthew Rabinowitz, filed Jan. 22, 2002; U.S. Non-provisional Patent Applications Ser. No. 10/159,831, issued as U.S. Pat. No. 6,522,297, "Position Location Using Ghost Canceling Reference Television Signals," by James J. Spilker and Matthew Rabinowitz, filed May 31, 2002; and U.S. Non-provisional Patent Application Ser. No. 10/054, 262, "Time-Gated Delay Lock Loop Tracking Of Digital Television Signals," by James J. Spilker and Matthew Rabinowitz, filed Jan. 22, 2002; U.S. patent application Ser. No. 10/159,478, "Position Location using Global Positioning Signals Augmented by Broadcast Television Signals," by Matthew Rabinowitz and James J. Spilker, filed May 31, 2002; and U.S. Non-provisional Patent Applications Ser. No. 10/290,984, issued as U.S. Pat. No. 6,952,182, "Position Location using Integrated Services Digital Broadcasting—Terrestrial (ISDB-T) Broadcast Television Signals," by James J. Spilker and Matthew Rabinowitz, filed Nov. 8, 2002; U.S. Patent Application Ser. No. 10/292,975, "Radio Frequency Device for Receiving TV Signals and GPS Satellite Signals and Performing Positioning," by Matthew Rabinowitz and James J. Spilker, filed Nov. 13, 2002; the disclosures thereof are incorporated by reference herein in their entirety.

BACKGROUND OF THE INVENTION

1. Field of the Invention

The present invention relates generally to position determination, and specifically to accurate position determination using reference signals with improved correlation characteristics.

2. Description of the Related Art

The Global Positioning System (GPS) technology has revolutionized the field of navigation and position location. Initially devised in 1974, the GPS is based on a constellation of 24 on-orbit satellites in sun-synchronous 12 hour circular, inclined orbits. Each satellite transmits a known pseudo-noise signal synchronized to an on-board precision atomic clock. The transmitted pseudo-noise signals can be precisely tracked by a receiver at an unknown location to determine pseudo-ranges. By tracking four or more satellites, one can determine precise position in three dimensions in real time, world-wide. More details are provided in (1) B. W. Parkinson and J. J. Spilker, Jr., Global Positioning System-Theory and Applications, Volumes I and II, AIAA, Washington, D.C. 1996, and (2) J. Spilker, Jr., Digital Communications by Satellite, Prentice-Hall, Englewood Cliffs, N.J., 1977, 1995, which are incorporated by reference herein in their entirety.

However, the effectiveness of GPS is limited in some situations because the GPS signals are transmitted at relatively low power levels (less than 100 watts), and over great distances, the received signal strength is relatively weak (on the order of −160 dBW as received by an omni-directional antenna). Thus the signal is marginally useful or not useful at all in the presence of line-of-sight blockage or while the receiver is inside a building.

This limitation or shortcoming of GPS technology can be overcome or ameliorated by employing position location technologies based on tracking broadcast television signals. High power, high bandwidth, low duty cycle, and superior geometries make various broadcast television signals ideal candidates for augmenting or improving position location where the GPS technology fails. For example, various digital television broadcast signals contain embedded synchronization codes which can be tracked for position determination purposes. The ATSC standard in the United States, the DVB standard in Europe, and the ISDB-T standard in Japan all employ an embedded synchronization code which is used to probe the transmission channel and mitigate the effects of multipath in a digital TV receiver. In order to be effective for channel modeling and multipath mitigation, these synchronization codes have wide bandwidths, narrow time autocorrelation functions, and high power levels. These features make the synchronization codes ideal for positioning, in particular for indoors positioning where multipath effects are severe and GPS signals may not penetrate. In addition, the Ghost-Canceling Reference (GCR) signals embedded in analog television broadcasts can be used for precise ranging. In recent years, analog television broadcasts have started to insert into their broadcasts a synchronization code termed the Ghost-Canceling Reference, which is used for multipath mitigation on analog signals in TV receivers that digitize the signal. High power characteristics and wide availability of GCR signals make them suitable for position location. Other test signals inserted in the analog broadcasts, such as the multiburst signal, may also be used for position determination.

In the GPS system, autocorrelation of a known Pseudo-Random-Number (PRN) sequence signal (i.e., a pseudo-noise signal) is used to determine pseudo-ranges. For synchronization code signals embedded in broadcast TV signals, however, autocorrelation of a synchronization code signal can yield significant sidelobes in addition to their main correlation peaks. This is because, unlike the GPS Gold-code PRN sequences, the signals were designed primarily for communication purposes, not for position determination. These sidelobes can be confused with multipath reflection signals, resulting in significant errors in pseudo-range measurements. However, it is not necessary for the local reference signal to be an exact match of the broadcast synchronization signal to be suitable for pseudo-range measurement purposes. It is possible for a non-identical reference signal to produce a robust main correlation peak while producing negligible sidelobes when correlated with a synchronization code signal. The possibility of ranging errors due to the presence of sidelobes would then be reduced or eliminated.

It can be seen that there exists a need in the art of position determination utilizing broadcast TV signals for a method and system for generating reference signals that produce minimal sidelobes when correlated with the broadcast signals. However, it is a mathematical property of correlation processing that, when the sidelobes are reduced, the coupling to high frequency noise tends to increase. Depending on the characteristics of the signal, very noisy correlation output can also result in significant errors in pseudo-range measurements. Furthermore, there may also be coupling to low frequency disturbance signals. Thus, there also exists a need for a method and system for generating reference signals that, when correlated with the broadcast signals, minimize couplings to high frequency noise and low frequency disturbance signals in addition to producing minimal sidelobes and large main peaks. Accordingly, it would be desirable to provide a method and system for generating reference signals with such improved correlation characteristics. It would also be desirable to provide a method and system for accurate position determination utilizing broadcast TV signals by employing reference signals with improved correlation characteristics of minimal sidelobes, minimal couplings to high frequency noise and low frequency disturbance signals and maximizing the main correlation peak.

SUMMARY OF THE INVENTION

Accordingly, the present invention addresses the foregoing need of generating reference signals with improved correlation characteristics and utilizing broadcast TV signals with improved correlation characteristics for position determination. Thus, the present invention provides the benefit of a method and system for generating reference signals that, when correlated with synchronization code signals or other components of broadcast TV signals, yield minimal sidelobes, produce large main peaks, and have minimal couplings to high frequency noise and low frequency disturbance signals. The present invention further provides the benefit of a method and system for accurate position determination utilizing broadcast TV signals by employing reference signals with improved correlation characteristics of minimal sidelobes, minimal coupling to high frequency noise, minimal coupling to low frequency disturbance signals and maximal main correlation peak.

According to one aspect of the invention, the present invention is a method for generating a reference signal with improved correlation characteristics, comprising: defining a known component of a broadcast television signal; defining an autocorrelation matrix for the known component of the broadcast television signal; generating an autocorrelation function of the known component of the broadcast television signal; identifying sidelobes in the autocorrelation function of the known component of the broadcast television signal; defining a sidelobe-producing matrix which produces only the identified sidelobes when applied to the known component of the broadcast television signal; and finding a reference signal which minimizes a product of the sidelobe-producing matrix and the reference signal.

In another aspect of the invention, the present invention is a method for generating a reference signal with improved correlation characteristics, comprising: defining a known component of a broadcast television signal; defining an autocorrelation matrix for the known component of the broadcast television signal; generating an autocorrelation function of the known component of the broadcast television signal; identifying sidelobes in the autocorrelation function of the known component of the broadcast television signal; defining a sidelobe producing matrix which produces only the identified sidelobes when applied to the known component of the broadcast television signal; and finding a reference signal which: (1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal.

According to yet another aspect of the invention, the present invention is a system for generating a reference signal with improved correlation characteristics, comprising: a computer with a display monitor; one or more input devices for processing operator inputs; and a storage device connected to the computer for storing data, wherein the computer processes a command input from one or more input devices for 1) defining a known component of a broadcast television signal, 2) defining an autocorrelation matrix for the known component of the broadcast television signal, 3) generating an autocorrelation function of the known component of the broadcast television signal, 4) identifying sidelobes in the autocorrelation function of the known component of the broadcast television signal, 5) defining a sidelobe producing matrix which produces only the identified sidelobes when applied to the known component of the broadcast television signal, and finding a reference signal which (a) minimizes a product of the sidelobe-producing matrix and the reference signal, (b) minimizes sensitivity to high frequency noise when cross-correlated with the known component of the broadcast television signal, (c) minimizes sensitivity to low frequency disturbance signals when cross correlated with the known component of the broadcast television signal, and (d) maximizes a main peak when cross-correlated with the known component of the broadcast television signal.

In yet another aspect of the invention, the present invention is computer-executable process steps for generating a reference signal with improved correlation characteristics, wherein the process steps are stored on a computer-readable medium, the steps comprising: a step for defining a known component of a broadcast television signal; a step for defining an autocorrelation matrix for the known component of the broadcast television signal; a step for generating an autocorrelation function of the known component of the broadcast television signal; a step for identifying sidelobes in the autocorrelation function of the known component of the broadcast television signal; a step for defining a sidelobe producing matrix which produces only the identified sidelobes when applied to the known component of the broadcast television signal; and a step for finding a reference signal which: (1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross-correlated with the known component of the broadcast television signal, and (4) maximizes a main peak when cross-correlated with the known component of the broadcast television signal.

According to yet another aspect of the invention, the present invention is a system for generating a reference signal with improved correlation characteristics, comprising: means for defining a known component of a broadcast television signal; means for defining an autocorrelation matrix for the known component of the broadcast television signal; means for generating an autocorrelation function of the known component of the broadcast television signal; means for identifying sidelobes in the autocorrelation function of the known component of the broadcast television signal; means for defining a sidelobe producing matrix which produces only the identified sidelobes when applied to the known component of the broadcast television signal; and means for finding a reference signal which: (1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal.

According to yet another aspect of the invention, the present invention is a method for accurately determining a position of a user terminal utilizing a reference signal with improved correlation characteristics, comprising: receiving at the user terminal a plurality of broadcast television signals from a plurality of television signal transmitters; determining pseudo-ranges between the user terminal and the plurality of television signal transmitters based on a correlation between a known component of the broadcast television signals and a local reference signal with improved correlation characteristics; and determining a position of the user terminal based on the pseudo-ranges, and a plurality of locations of the television signal transmitters, wherein the correlation between the known component of the broadcast television signals and the local reference signal with improved correlation characteristics has minimized sidelobes, a large main peak, and minimized sensitivity to high frequency noise and low frequency disturbances.

In yet another aspect of the invention, the present invention is a system for accurately determining a position of a user terminal utilizing a reference signal with improved correlation characteristics, comprising: means for receiving at the user terminal a plurality of broadcast television signals from a plurality of television signal transmitters; means for determining a first set of pseudo-ranges between the user terminal and the plurality of television signal transmitters based on a correlation between a known component of the broadcast television signals and a local reference signal with improved correlation characteristics; means for receiving at the user terminal a plurality of global positioning signals from a plurality of global positioning satellites; means for determining a second set of pseudo-ranges between the user terminal and the plurality of global positioning satellites based on the plurality of global positioning signals; and means for determining a position of the user terminal based on the first set and the second set of pseudo-ranges, a plurality of locations of the television signal transmitters, and a plurality of locations of the global positioning satellites; wherein the correlation between the known component of the broadcast television signals and the local reference signal with improved correlation characteristics has minimized sidelobes, a large main peak, and minimized sensitivity to high frequency noise and low frequency disturbances.

Other and further objects and advantages of the present invention will be further understood and appreciated by those skilled in the art by reference to the following specification, claims, and drawings.

DETAILED DESCRIPTION OF THE PREFERRED EMBODIMENT

Figure 1:
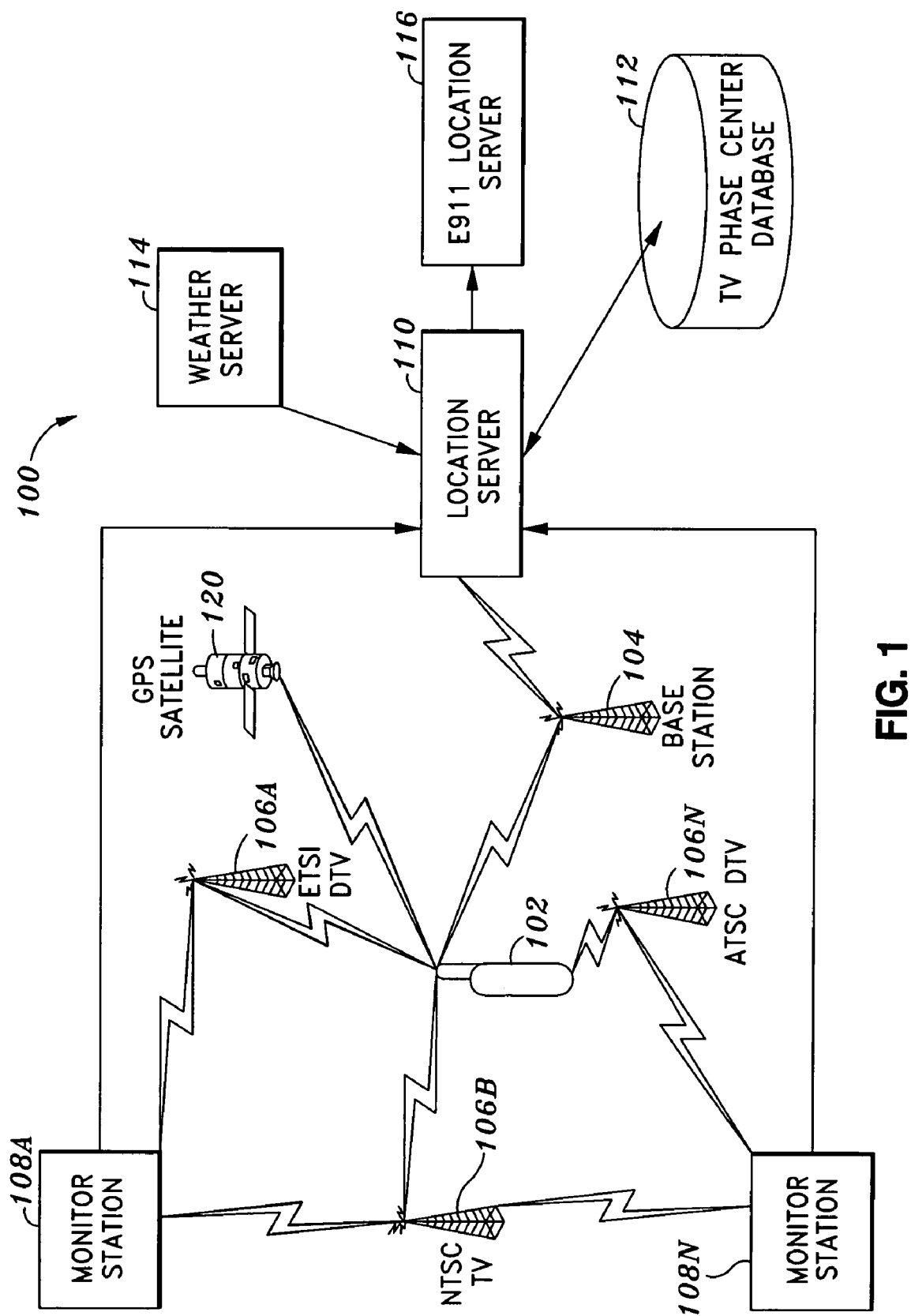
FIG. 1 illustrates an overview of a system environment in which the present invention is implemented.

FIG. 1 illustrates an overview of a system environment in which the present invention is implemented. As shown in FIG. 1, user terminal 102 communicates over an air link with a base station 104. In one embodiment, the user terminal 102 is a wireless telephone and the base station 104 is a wireless telephone base station. Base station 104 can be a part of a mobile metropolitan area network("MAN") or a wide area network ("WAN") without departing from the scope of the present invention. Additionally, the phrase "user terminal" refers to any device capable of implementing the position determination techniques described herein. Examples of user terminals include PDAs (Personal Digital Assistants), mobile phones, cars and other vehicles, and any object which could include a chip or software implementing the position determination techniques described herein. Further, the term "user terminal" is not intended to be limited to units which are "terminals" or which are operated by "users."

Figure 2:
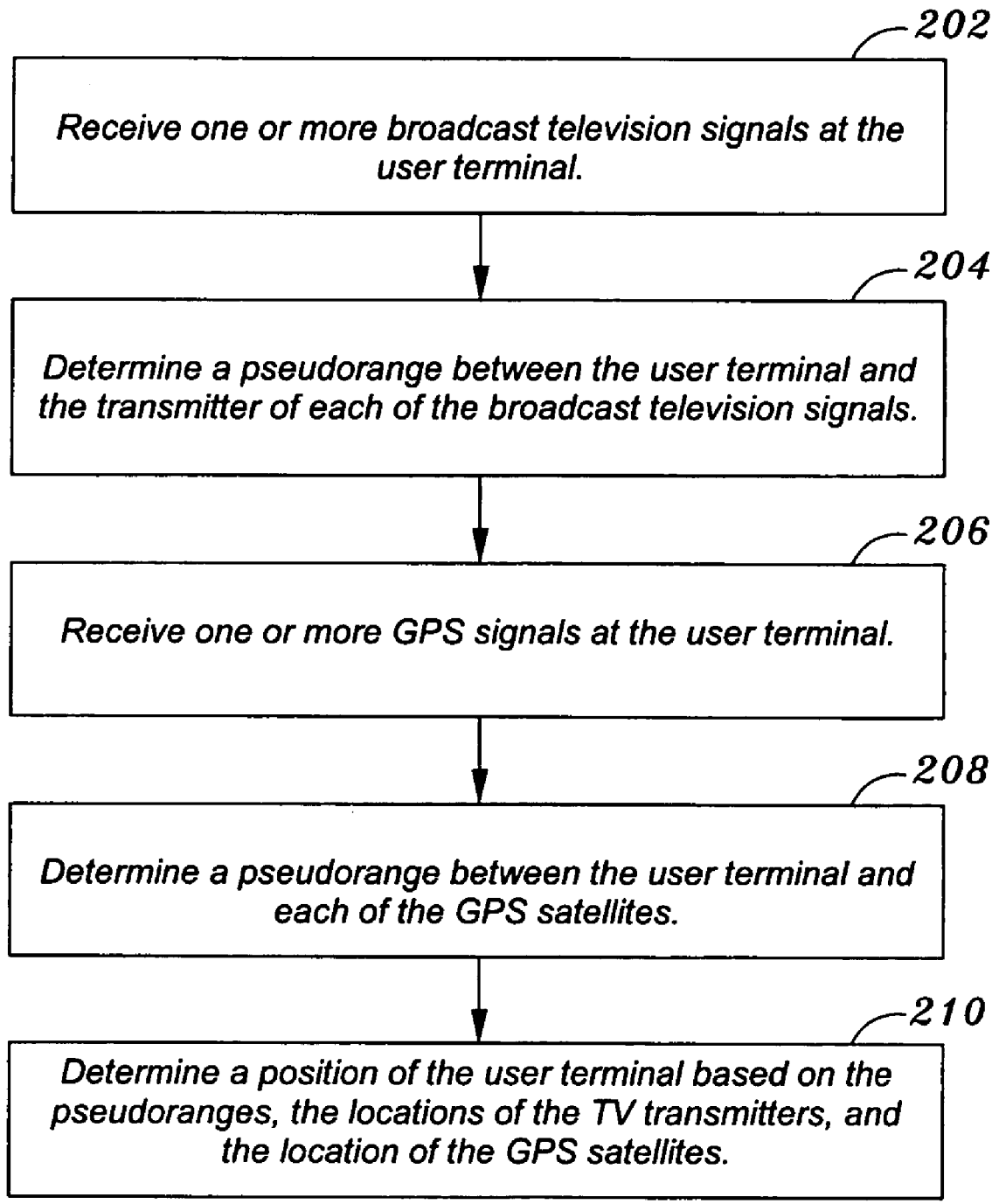
FIG. 2 illustrates a flow chart in accordance with the present invention.

As described in FIG. 2, a method for position determination comprises receiving at the user terminal a first set of broadcast television signals from television signal transmitters (step 202); determining a first set of pseudo-ranges between the user terminal and the television signal transmitters based on a known component of the broadcast television signal (step 204); receiving at the user terminal a second set of global positioning signals from a set of available global positioning satellites (step 206); determining a second set of pseudo-ranges between the user terminal and the available global positioning satellites based on the global positioning signals (step 208); and determining a position of the user terminal based on the first and second set of pseudo-ranges, the locations of the set of television signal transmitters, and the locations of the set of global positioning satellites (step 210).

As shown in FIG. 1, user terminal 102 receives broadcast signals from one or more TV transmitters 106A and 106B through 106N. Shown as examples, TV transmitter 106A is an ETSI (DVB) transmitter, TV transmitter 106B is an NTSC transmitter, and TV transmitter 106N is an ATSC transmitter. However, other combinations can be implemented without departing from the scope of the present invention, including transmitters of the ISDB signal used in Japan. User terminal 102 determines a pseudo-range between the user terminal 102 and each TV transmitter 106A-106N (not all are shown). Each pseudo-range represents the apparent time difference (or equivalent distance) between a time of transmission from a transmitter 106A-106N of a component of the TV broadcast signal and a time of reception at the user terminal 102 of the component, as well as a clock offset at the user terminal. User terminal 102 transmits the pseudo-ranges to location server 110. Location server 110 can also receive weather information describing the air temperature, atmospheric pressure, and humidity in the vicinity of user terminal 102 from a weather server 114, without departing from the scope of the present invention. The TV signals are also received by a plurality of monitor units 108A through 108N, as shown in FIG. 1. Each monitor unit 108A-108N measures (for each of the TV transmitters 106A-106N from which it receives TV signals) a time offset between the local clock of that TV transmitter 106A-106N and a reference clock. Location server 110 receives information describing the antenna phase center (i.e., the radiating source location) of each TV transmitter 106A-106N from a database 112.

User terminal 102 receives GPS signals from one or more GPS satellites 120. User terminal 102 also receives almanac data describing Doppler shifts and pseudo-noise indices for GPS satellites 120. Then, user terminal 102 determines a pseudo-range between the user terminal and each GPS satellite 120. Each pseudo-range represents the apparent time difference (or equivalent distance) between a time of transmission from a GPS satellite 120 of a component of the GPS signal and a time of reception at the user terminal 102 of the component. Clock offset at the GPS satellite 120 is also included in the almanac data. Next, the user terminal 102 transmits the pseudo-ranges to location server 110. Finally, the location server 110 determines a position of the user terminal 102 based on the pseudo-ranges, locations of each of the TV transmitters 106A-106N and locations of the GPS satellites 120. The details of techniques outlined above are disclosed in U.S. patent application Ser. No. 10/292,975, "Radio Frequency Device for Receiving TV Signals and GPS Satellite Signals and Performing Positioning," by Matthew Rabinowitz and James J. Spilker, filed Nov. 13, 2002, the disclosure thereof is incorporated by reference herein in its entirety.

Known components of the broadcast television signal used to measure pseudo-ranges may be synchronization codes or other suitable components known to one skilled in the art. These embedded synchronization codes, used to probe the transmission channel and mitigate the effects of multipath in a digital TV receiver, have wide bandwidths, narrow time autocorrelation functions, and high power levels. These features make the synchronization codes ideal for positioning, in particular for indoors positioning where multipath effects are severe and GPS signals may not penetrate.

Figure 3A:
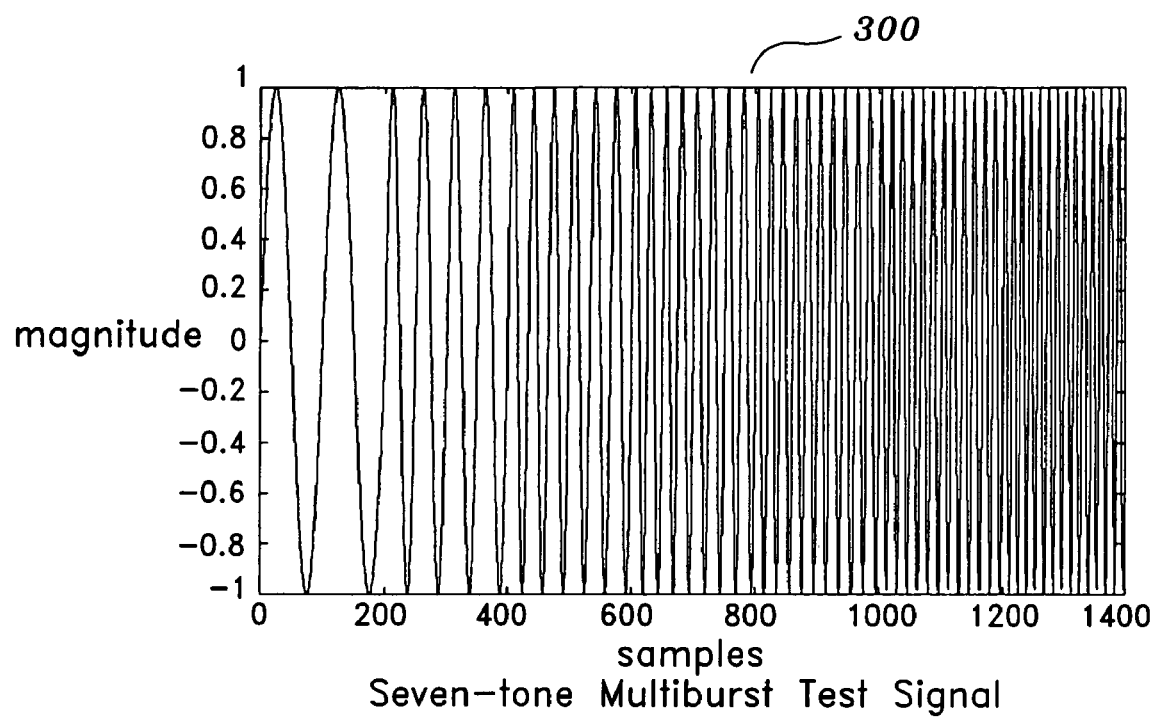
FIG. 3a shows a seven-tone multiburst test signal.
Figure 3B:
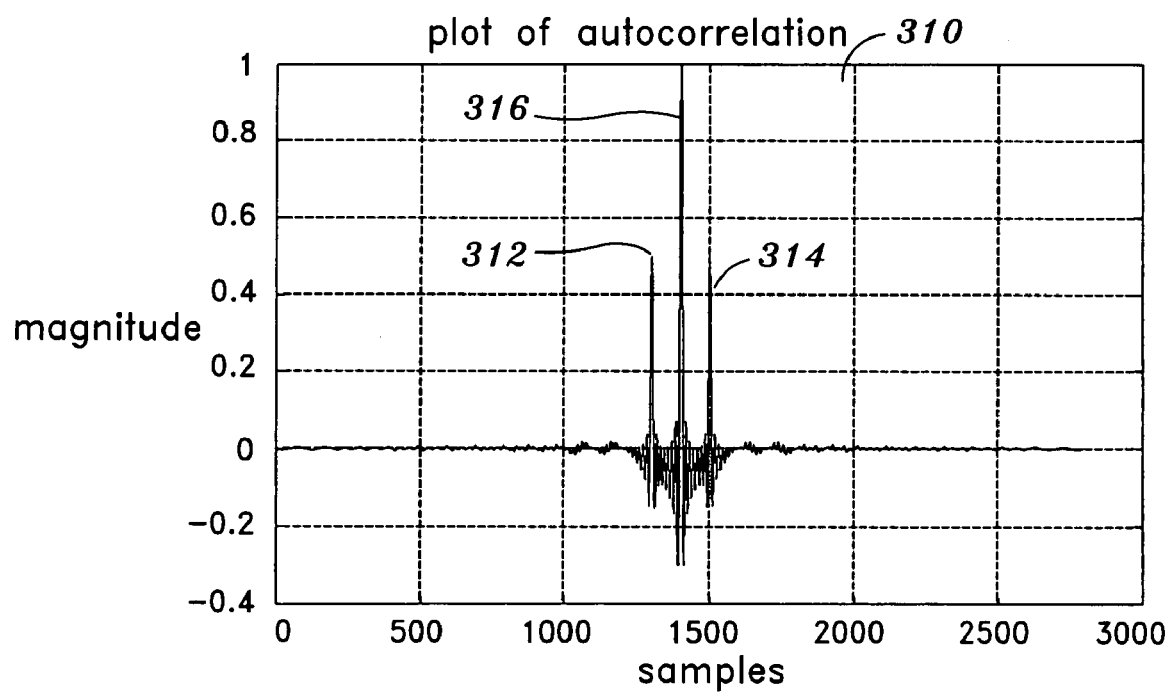
FIG. 3b shows an autocorrelation function of the seven-tone multiburst test signal.

Similar to conventional GPS processing, pseudoranges may be measured by using synchronization codes embedded in broadcast TV signals and correlating the received signals with reference signals. However, unlike the GPS Gold-code PRN sequences, the broadcast TV synchronization code signals do not have optimal correlation properties, as the signals were designed primarily for communication purposes, not for position determination. In particular, the autocorrelation function for the synchronization signals can have significant sidelobes in addition to their main correlation peaks. FIG. 3a and FIG. 3b illustrate sidelobe effects in an autocorrelation output. A seven-tone multiburst test signal 300 is shown in FIG. 3a, and its autocorrelation 310 in FIG. 3b. As shown in FIG. 3b, sidelobes 312 and 314 are quite prominent, compared to correlation main peak 316. These sidelobes can be confused for multipath reflection signals, resulting in significant errors in pseudorange measurements, which in turn translate into errors in position determination.

However, it is not necessary for the reference signal to be an exact match of the broadcast synchronization signal. A non-identical reference signal can produce a robust main correlation peak while creating negligible or attenuated sidelobes. In one embodiment, the present invention is a method for determining a position of a user terminal utilizing a reference signal that is not an exact match of the broadcast synchronization signal but a modified version that has improved correlation characteristics. Ideally, to ensure accurate pseudo-range determination, the correlation between the received signal and the reference signal attains the following characteristics: large main peak, negligible sidelobes, reduced sensitivity to high frequency noise, and reduced sensitivity to low frequency disturbances. By using a non-identical reference signal with such characteristics, ranging errors due to sidelobes can be significantly reduced.

Figure 4A:
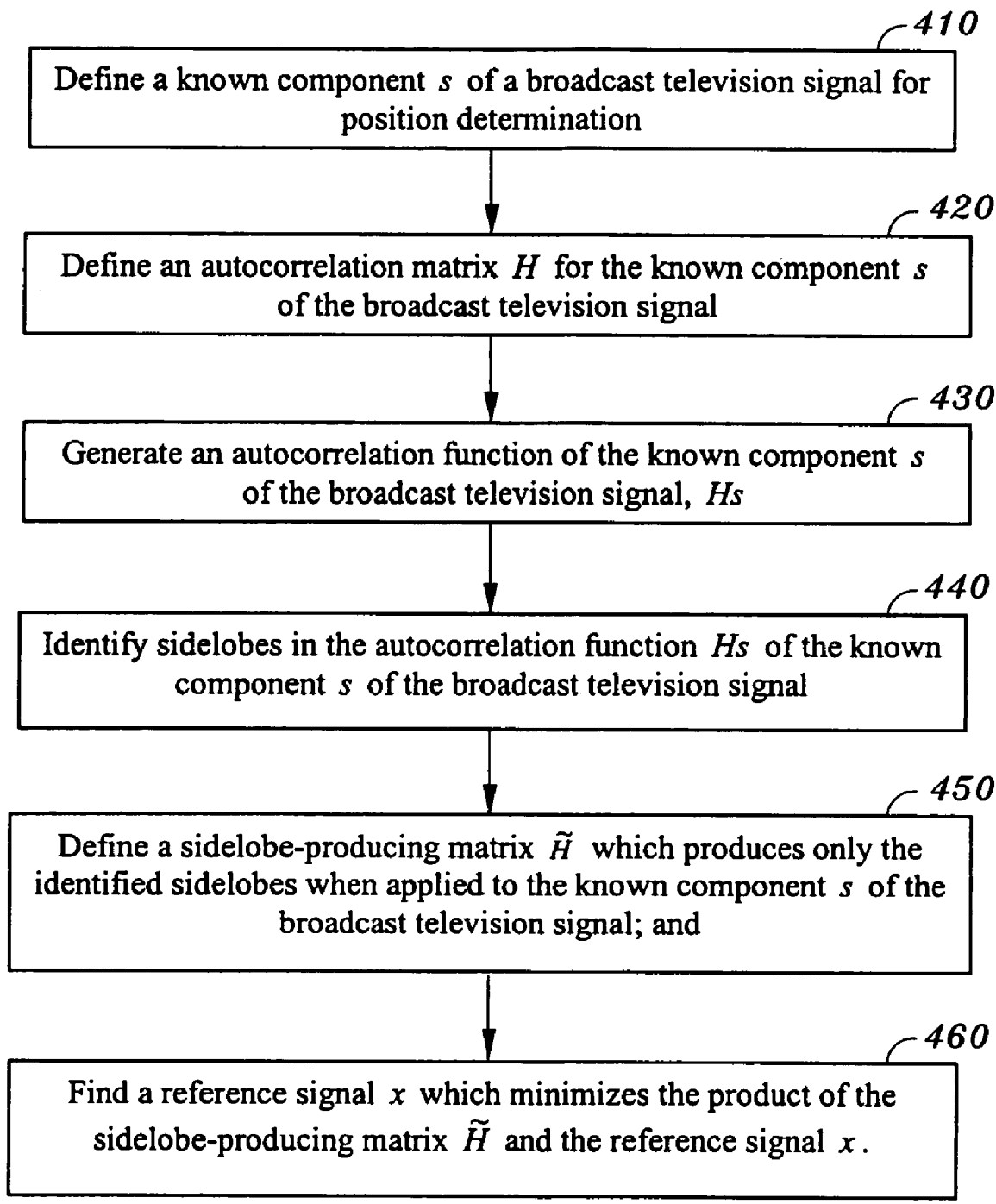
FIG. 4a and FIG. 4b are flow charts in accordance with the present invention for generating a reference signal with improved correlation characteristics.
Figure 4B:
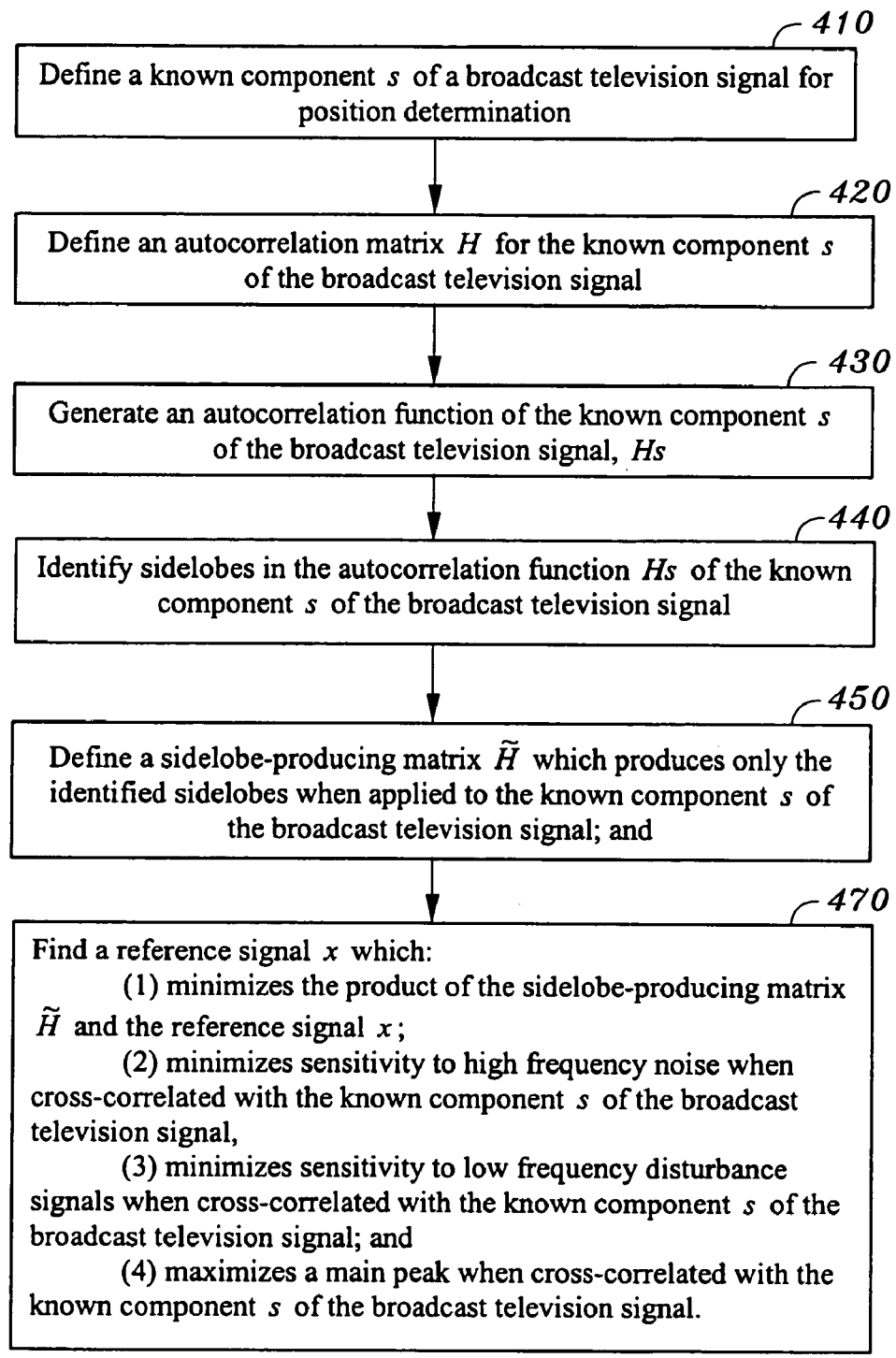

According to another aspect of the invention, the present invention is a method for generating a reference signal with improved correlation characteristics. As shown in FIG. 4a, a method for generating a reference signal with improved correlation characteristics comprises: defining a known component of a broadcast television signal (Step 410); defining an autocorrelation matrix for the known component of the broadcast television signal (Step 420); generating an autocorrelation function of the known component of the broadcast television signal (Step 430); identifying sidelobes in the autocorrelation function of the known component of the broadcast television signal (Step 440); defining a sidelobe-producing matrix which produces only the identified sidelobes when applied to the known component of the broadcast television signal (Step 450); and finding a reference signal which minimizes a product of the sidelobe-producing matrix and the reference signal (Step 460). FIG. 4b shows another method for generating a reference signal with improved correlation characteristics, wherein the last step comprises: finding a reference signal which (1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal (Step 470). A highly simplified example illustrating the steps of FIG. 4a and FIG. 4b is given below. One skilled in the art will understand that the example is given for illustrative purposes only and does not limit the scope of the present invention.

A known component of a broadcast television signal can be defined (Step 410) as synchronization codes embedded in the digital broadcast TV signals including ATSC, the DVB, and the ISDB-T signals, as well as signals embedded in analog TV signals including GCR and multiburst signals, without departing from the scope of the present invention.

Generating an autocorrelation matrix for the known component of a broadcast television signal (Step 420) can be achieved by populating the rows of the autocorrelation matrix with time-shifted versions of the known component of a broadcast television signal. As a simple example, for a signal $s^T = [1 -1 1]$, the autocorrelation matrix is a matrix H where $$H = \begin{bmatrix} 1 & 0 & 0 \\ -1 & 1 & 0 \\ 1 & -1 & 1 \\ 0 & 1 & -1 \\ 0 & 0 & 1 \end{bmatrix}$$

For non-trivial signals, generating the autocorrelation matrix can be performed by utilizing libraries or packages known to one skilled in the art such as, but not limited to, MATLAB, MathCAD, or Mathematica. Customized applications written in C, C++, FORTRAN or any other computer programming language known to one skilled in the art can also be employed without departing from the scope of the present invention.

Generating an autocorrelation of the known component of a broadcast television signal (Step 430) can be accomplished by applying (i.e., multiplying) the autocorrelation matrix H to the known component s of a broadcast television signal. In the above example, the autocorrelation function of s is Hs which is $[1\ -2\ 3\ -2\ 1]^T$. That is: autocorrelation function of s is $$Hs = \begin{bmatrix} 1 & 0 & 0 \\ -1 & 1 & 0 \\ 1 & -1 & 1 \\ 0 & 1 & -1 \\ 0 & 0 & 1 \end{bmatrix} \begin{bmatrix} 1 \\ -1 \\ 1 \end{bmatrix} = \begin{bmatrix} 1 \\ -2 \\ 3 \\ -2 \\ 1 \end{bmatrix}.$$

In this example, the main peak has the value of 3 and the sidelobes are identified to have the values −2 and 1 on either side of the main peak (Step 440). It can be seen that the sidelobes in the autocorrelation function of s are produced by the first, second, fourth, and fifth rows of the autocorrelation matrix H when H is multiplied by s. Thus, the sidelobe producing matrix $\tilde{H}$ comprises the first, second, fourth, and fifth rows of the autocorrelation matrix H (without the middle row of H) (Step 450):

$$\tilde{H} = \begin{bmatrix} 1 & 0 & 0 \\ -1 & 1 & 0 \\ 0 & 1 & -1 \\ 0 & 0 & 1 \end{bmatrix}$$

Note that the cross-correlation between the signal s and a reference signal x is given by Hx. Thus, the sidelobes of cross-correlation between s and x (i.e., Hx) would be minimized if $\tilde{H}x$ is minimized. Therefore, once the sidelobe-producing matrix has been identified, the reference signal that produces minimal sidelobes when cross-correlated with the known component of the broadcast television signal can be generated by finding x that minimizes $\tilde{H}x$. That is, we seek a reference signal which minimizes a product of the sidelobe-producing matrix $\tilde{H}$ and the reference signal x (Step 460).

Several optimization techniques may be employed in finding the reference signal which produces reduced sidelobes when correlated with the known component of a broadcast television signal. See, e.g., R. Fletcher, "Practical Methods of Optimization" (John Wiley & Sons, 2nd edition, 2000); P. Venkataraman, "Applied Optimization with MATLAB Programming" (Interscience, 2001); and David G. Luenberger, "Optimization by Vector Space Methods" (Interscience, 1997).

In one embodiment, the present invention employs a Quadratic Programming (QP) approach to constrained optimization to create reference signals with desired correlation properties. However, it is known to one skilled in the art that other optimization techniques may be employed without departing from the scope of the present invention.

Under a Quadratic Programming (QP) approach, the sidelobes can be minimized by minimizing $\|\tilde{H}x\|_2$, which is the same as minimizing $x^T\tilde{H}^T\tilde{H}x$, where $\|\tilde{H}x\|_2$ is the 2-norm of $\tilde{H}x$, and where $x^T$ and $\tilde{H}^T$ are transposes of x and $\tilde{H}$, respectively. $\|\tilde{H}\|_2$ is defined as $$\sqrt{\sum_{i=0}^{M}\left(\sum_{j=0}^{N}\tilde{H}_{ij}x_j\right)^2}.$$

Then, because the square root is a monotonic function, $\|\tilde{H}s\|_2$ is minimized if and only if $$\sqrt{\sum_{i=0}^{M}\left(\sum_{j=0}^{N}\tilde{H}_{ij}x_j\right)^2}$$

is minimized. Thus, since $$\sum_{i=0}^{M}\left(\sum_{j=0}^{N}\tilde{H}_{ij}x_j\right)^2 = x^T\tilde{H}^T\tilde{H}x,$$

minimizing $\|\tilde{H}s\|_2$ is the same as minimizing $x^T\tilde{H}^T\tilde{H}x$. Finding the solution can be accomplished by utilizing available tools such as, but not limited to, MATLAB or Mathematica without departing from the scope of the present invention. The optimization technique may also be a customized software application. Such software applications can be written in C, C++, FORTRAN or any other computer programming language known to one skilled in the art without departing from the scope of the present invention.

Figure 5A:
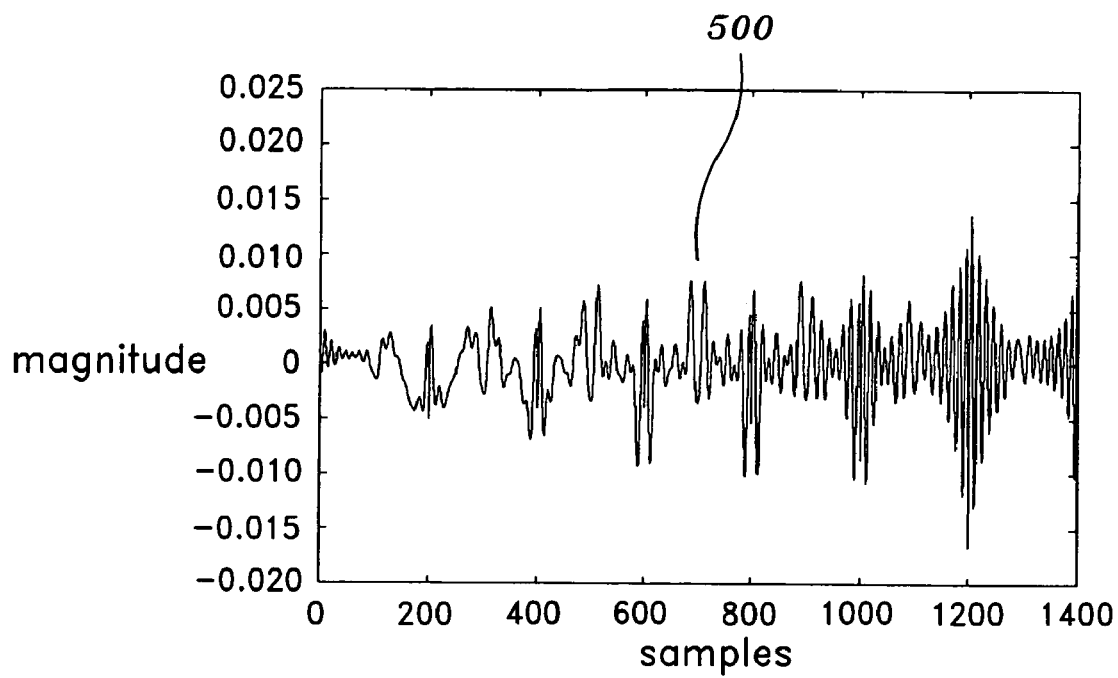
FIG. 5a illustrates a reference signal for the seven-tone multiburst test signal with improved correlation characteristics for minimal sidelobes.
Figure 5B:
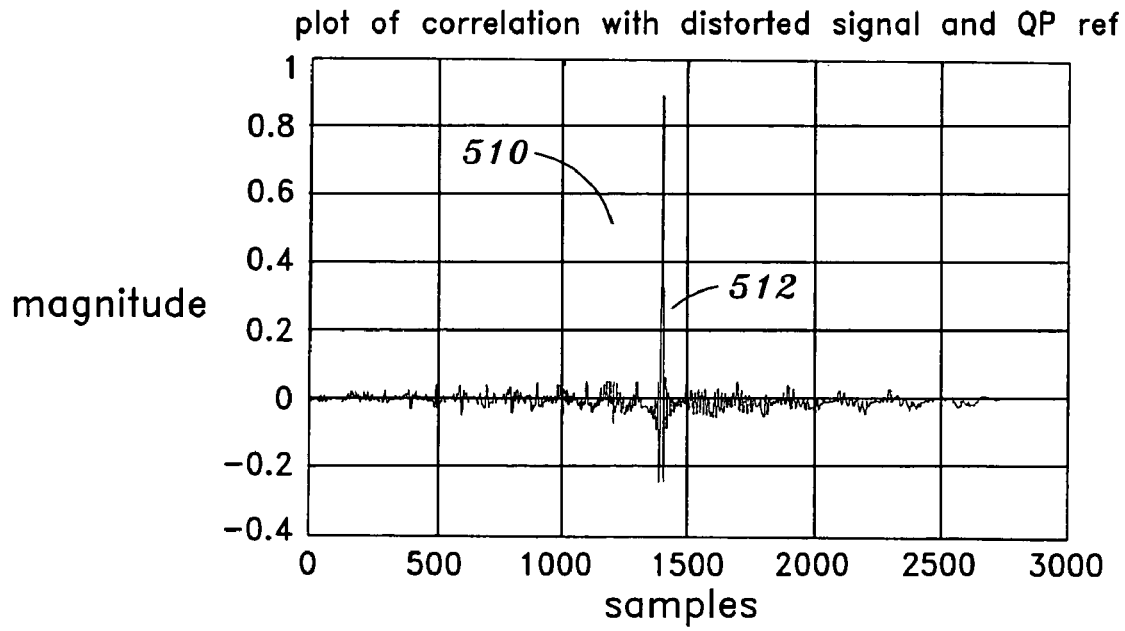
FIG. 5b illustrates the cross-correlation of the reference signal of FIG. 5a with the seven-tone multiburst test signal.

FIG. 5a illustrates an embodiment of a reference signal with improved correlation characteristics. Shown in FIG. 5a is reference signal 500 generated for the seven-tone multiburst test signal 300 by the Quadratic Programming method. FIG. 5b shows cross-correlation 510 of the seven-tone multiburst test signal 300 with the reference signal 500 created from the QP optimization. The correlation main peak 512 is robust, and the sidelobes have become negligible.

Figure 6A:
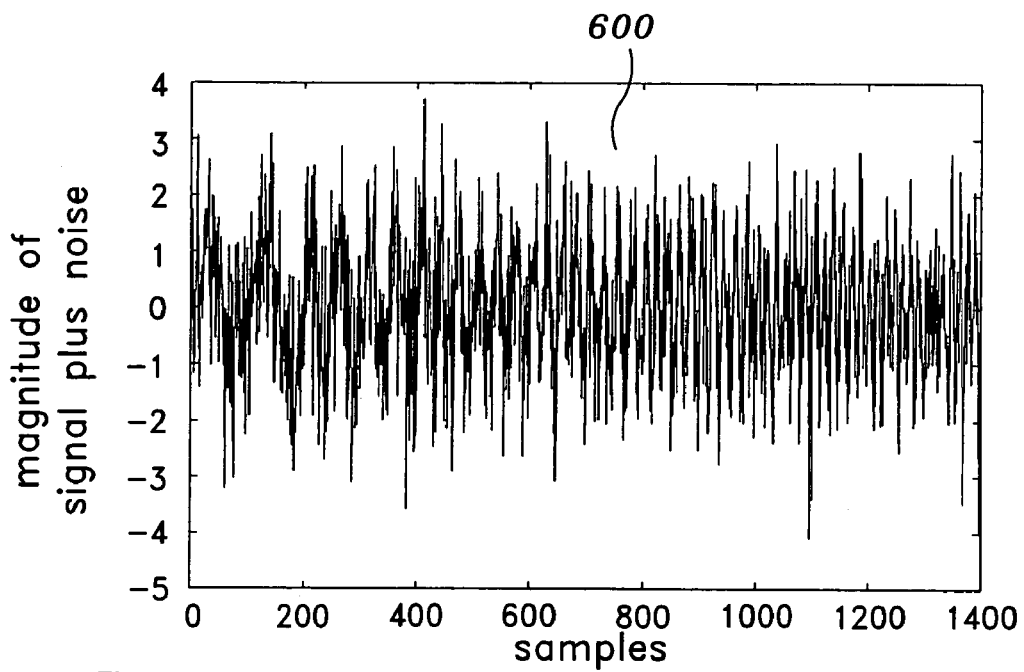
FIG. 6a and FIG. 6b illustrate the effects of high-frequency noise in the graphs of FIG. 5a and FIG. 5b respectively.
Figure 6B:
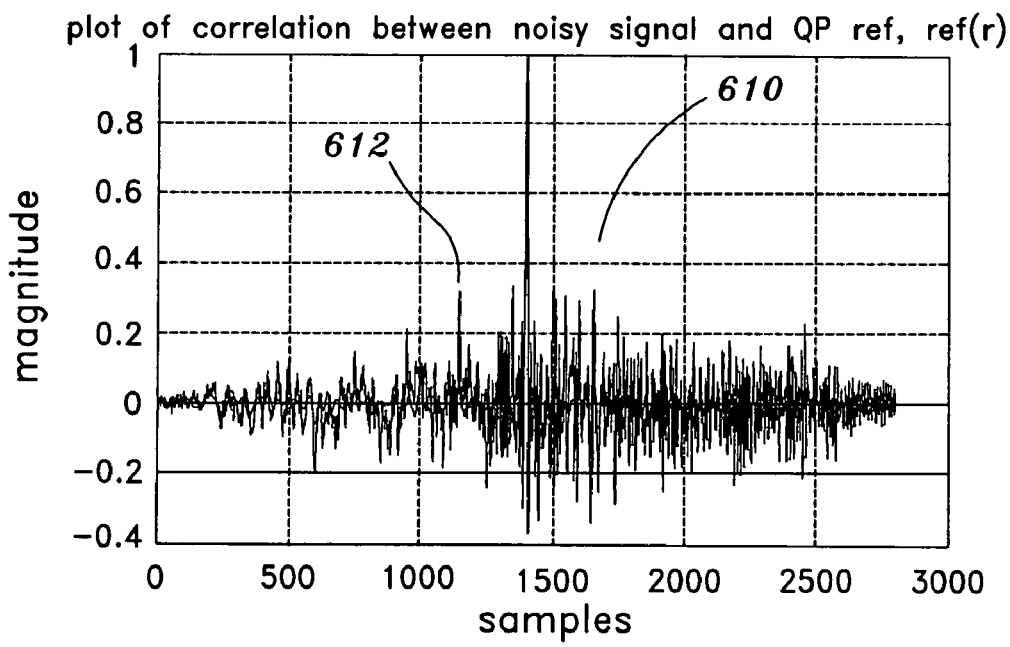

However, it is an inherent mathematical property of correlation processing that when the sidelobes are reduced the coupling to high frequency noise increases. FIG. 6a shows seven-tone multiburst signal 600 in the presence of AWGN (Additive White Gaussian Noise) such that the resultant signal-to-noise ratio (SNR) is −3 dB. As shown in FIG. 6b, cross-correlation 610 between seven-tone multiburst signal in the presence of AWGN (600) and the reference signal created from the QP optimization (500) has large noise spikes (612) due to high frequency coupling. As with large sidelobes, such large noise spikes can lead to errors in pseudo-range measurements. Thus, for some broadcast TV signals with high frequency noise, Step 460 of FIG. 4a is modified with a further constraint that sensitivity to high-frequency noise is minimized (i.e., the high-frequency coupling of the reference signal x is minimized). On the other hand, for signals with little or no high-frequency noise, this constraint can be omitted without departing from the scope of the present invention.

Let X=Fx, where $$X = \mathit{fft}(x) \text{ or } X(k) = \sum_{n=0}^{N-1} x(n)\exp\left(\frac{-j2\pi kn}{N}\right).$$

fft(x) is the Fast Fourier Transform of the reference signal x, and F is the Fast Fourier Transform matrix. $k_{lim}$ is a limit frequency such that the maximum value of |X(k)| is minimized over all $k > k_{lim}$. As noted above, x is an N-by-1 matrix (or an N-vector). Let $\tilde{X}$ contain just elements of $k_{lim}+1 \to N$ of matrix X and let $\tilde{F}$ contain just rows of $k_{lim}+1 \to N$ of matrix F. Now, decompose $\tilde{X}$ and $\tilde{F}$ into their real and imaginary parts, such that $\tilde{X}=\tilde{X}_r+j\tilde{X}_i$ and $\tilde{F}=\tilde{F}_r+j\tilde{F}_i$. Task of minimizing high frequency coupling above $k_{lim}$ can be described as minimizing $\|\tilde{X}\|_2 = \tilde{X}_r^T\tilde{X}_r + \tilde{X}_i^T\tilde{X}_i = x^T(\tilde{F}_r^T\tilde{F}_r + \tilde{F}_i^T\tilde{F}_i)x$, where $\|\tilde{X}\|_2$ is the $l_2$ norm of $\tilde{X}$. Other norms of $\tilde{X}$ known to one skilled in the art may also be used without departing from the scope of the present invention.

Solution for the reference signal x that minimizes the sidelobes while minimizing the high-frequency coupling is equivalent to finding x that minimizes $x^T(\lambda\tilde{H}^T\tilde{H}+\tilde{F}_r^T\tilde{F}_r+\tilde{F}_i^T\tilde{F}_i)x$, where $\lambda$ is a weighting factor to be determined empirically.

Moreover, we also want to limit the extent to which the reference signal couples with low frequency disturbance signals. This is particularly important where the acquisition of the synchronization code can be hindered by interference from the luminescence carrier in TV transmissions. One approach to minimize coupling to low frequency disturbance signals is to ensure that the reference signal is zero mean, in other words $1^T x=0$ where $1^T$ is a 1 by N matrix of all ones. Additionally, maximization of the normalized correlation main peak is equivalent to requiring $s^T x=1$. Then, the task of finding the reference signal x with improved correlation characteristics is equivalent to solving for x that minimizes $x^T(\lambda\tilde{H}^T\tilde{H}+\tilde{F}_r^T\tilde{F}_r+\tilde{F}_i^T\tilde{F}_i)x$, subject to the constraints $s^T x=1$ and $1^T x=0$.

Note that the empirically determined weighting factor $\lambda$ allows the trade-off between minimizing the sidelobes and limiting high-frequency coupling. Thus, several reference signals can be generated for the same anticipated incident signal (i.e., a particular known component of a broadcast TV signal) with different values of $\lambda$. Then, different reference signals particularly optimized for different set of trade-offs can be used to correlate with the same incident signal depending on the circumstances. For example, one reference signal may be particularly optimized to have minimum sidelobes, and another to have minimum coupling to high frequency noise. When correlating with the incident signal at the user terminal or receiver, a reference signal can be selected from a set of particularly optimized reference signals with varying correlation characteristics. Note also that both the high-frequency and low-frequency coupling constraints can be eliminated for some signals and/or situations without departing from the scope of the present invention.

The matrix and vector representation and methodology described above are presented for the purpose of description and illustration only, and are not meant to limit the scope of the present invention. Other representation and methodologies known to those skilled in the art can be employed without departing from the scope of the present invention.

For example, the matrices and vectors can be complex operators and vectors in Hilbert space or Banach space. And various mathematical techniques in complex analysis and functional analysis can be utilized to solve the optimization problem formulated in the present invention to generate the reference signals with desired correlation properties.

Figure 7A:
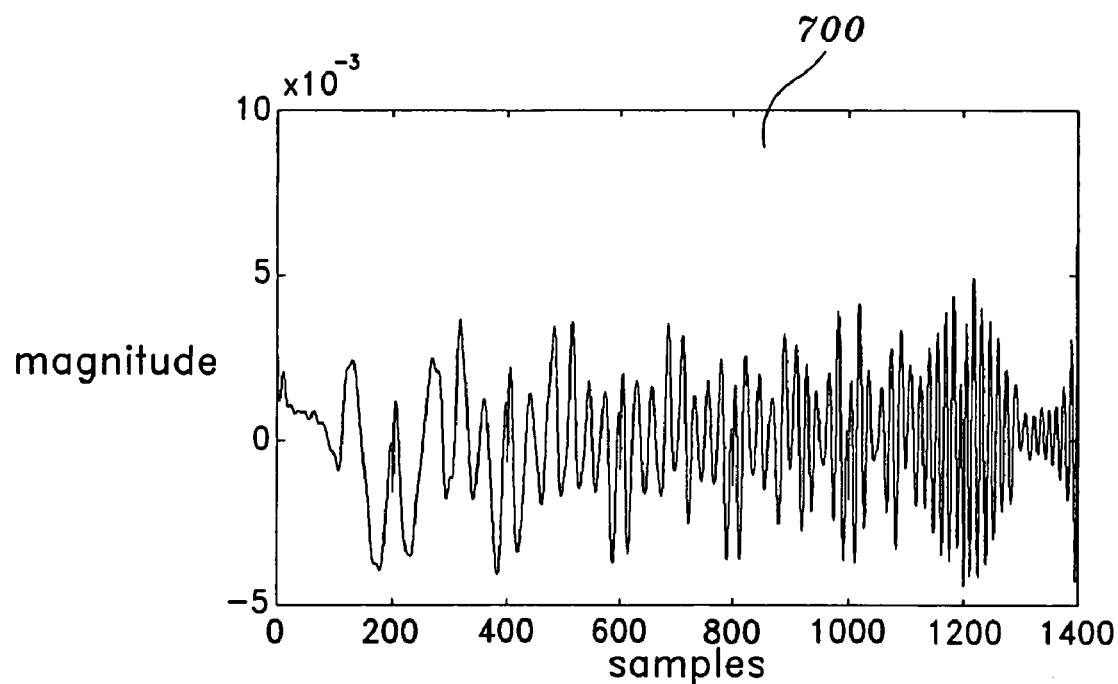
FIG. 7a illustrates a reference signal for the seven-tone multiburst test signal with improved correlation characteristics for a large correlation main peak, minimized sidelobes, and minimized high and low frequency couplings.
Figure 7B:
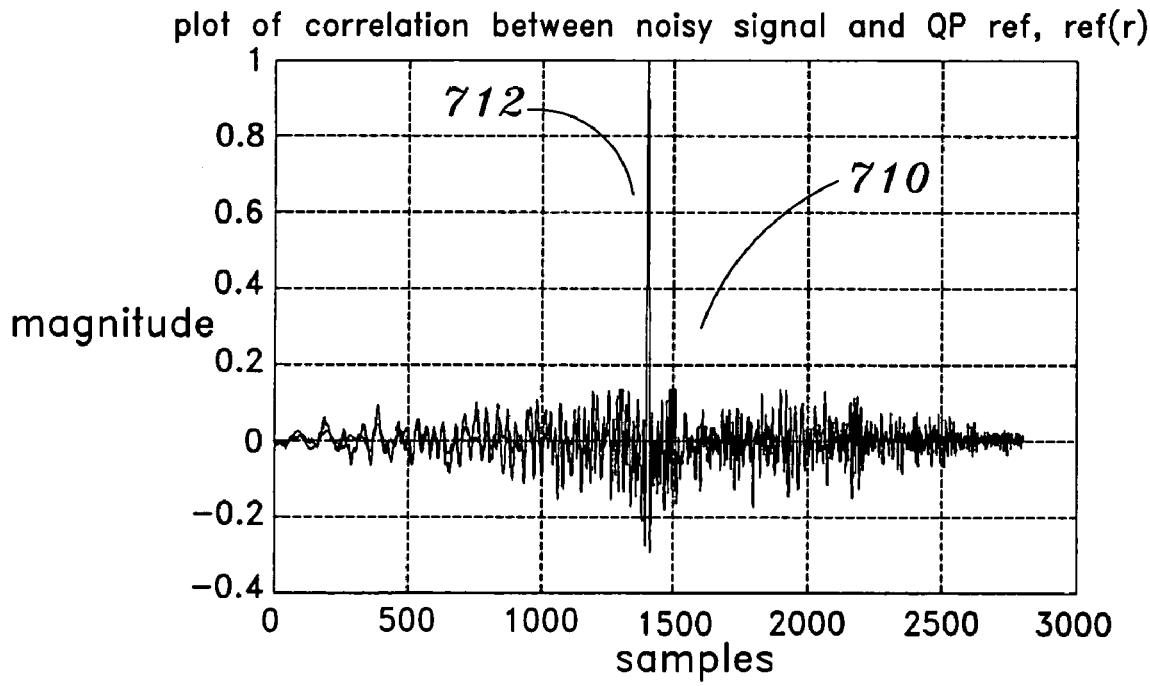
FIG. 7b illustrates the cross-correlation of the reference signal of FIG. 7a with the seven-tone multiburst test signal.

FIG. 7a shows reference signal 700 created by a constrained QP optimization described above with $\lambda=10$. Also shown in FIG. 7b is cross-correlation 710 between seven-tone multiburst signal in the presence of AWGN (600) with reference signal (700) created by the constrained QP optimization with $\lambda=10$. As shown, the noise spikes due to high-frequency coupling are virtually eliminated while the main correlation peak 712 is large in comparison to the rest of the signal.

Figure 8A:
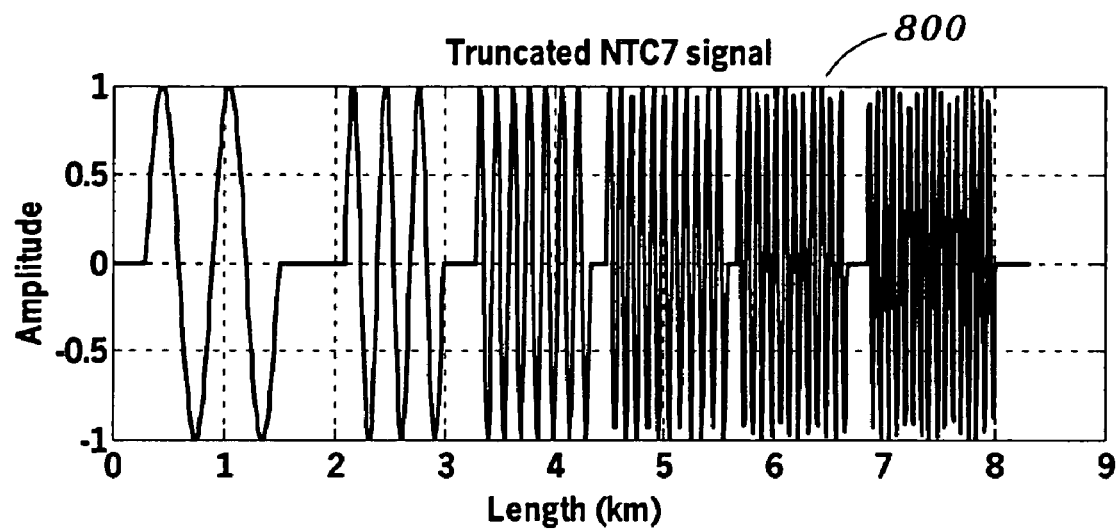
FIG. 8a illustrates a truncated NTC7 Combination signal.
Figure 8B:
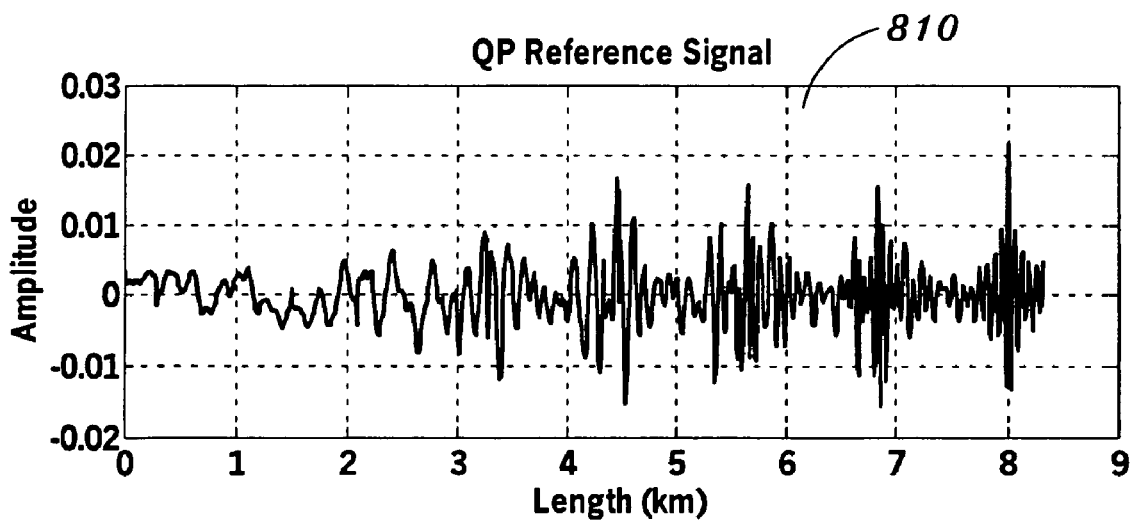
FIG. 8b illustrates a reference signal for the truncated NTC7 Combination signal with improved correlation characteristics for a large correlation main peak, minimized sidelobes, and minimized high and low frequency couplings.
Figure 9A:
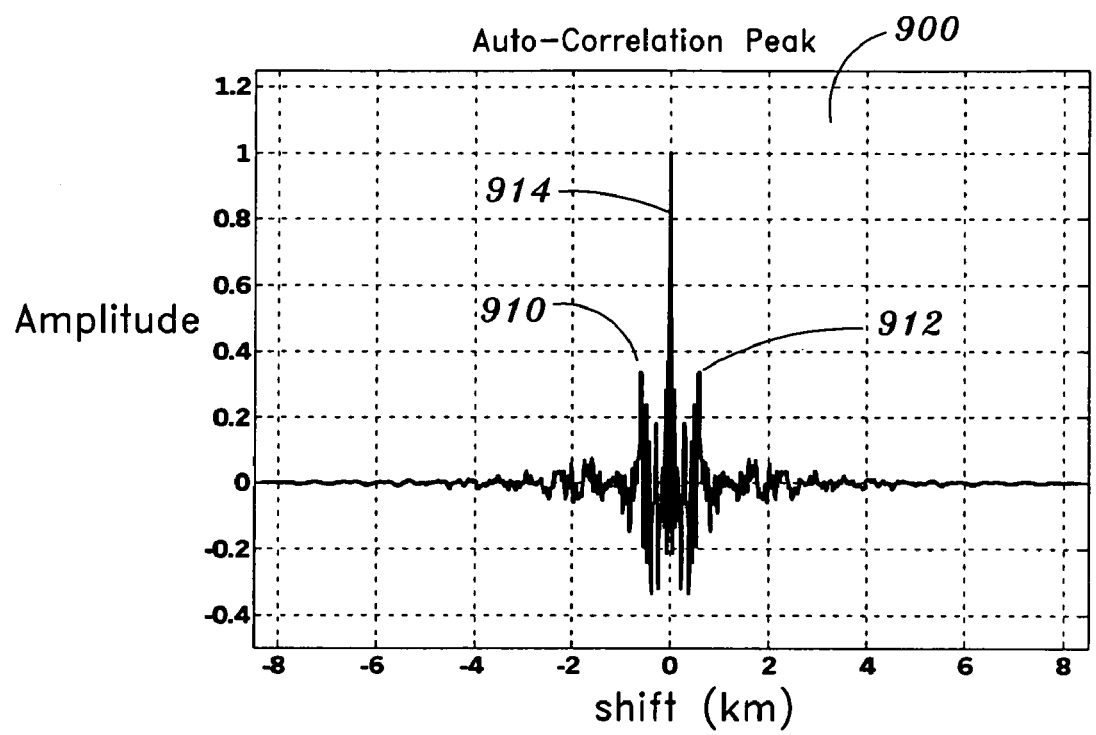
FIG. 9a shows an autocorrelation function for the truncated NTC7 Combination signal.
Figure 9B:
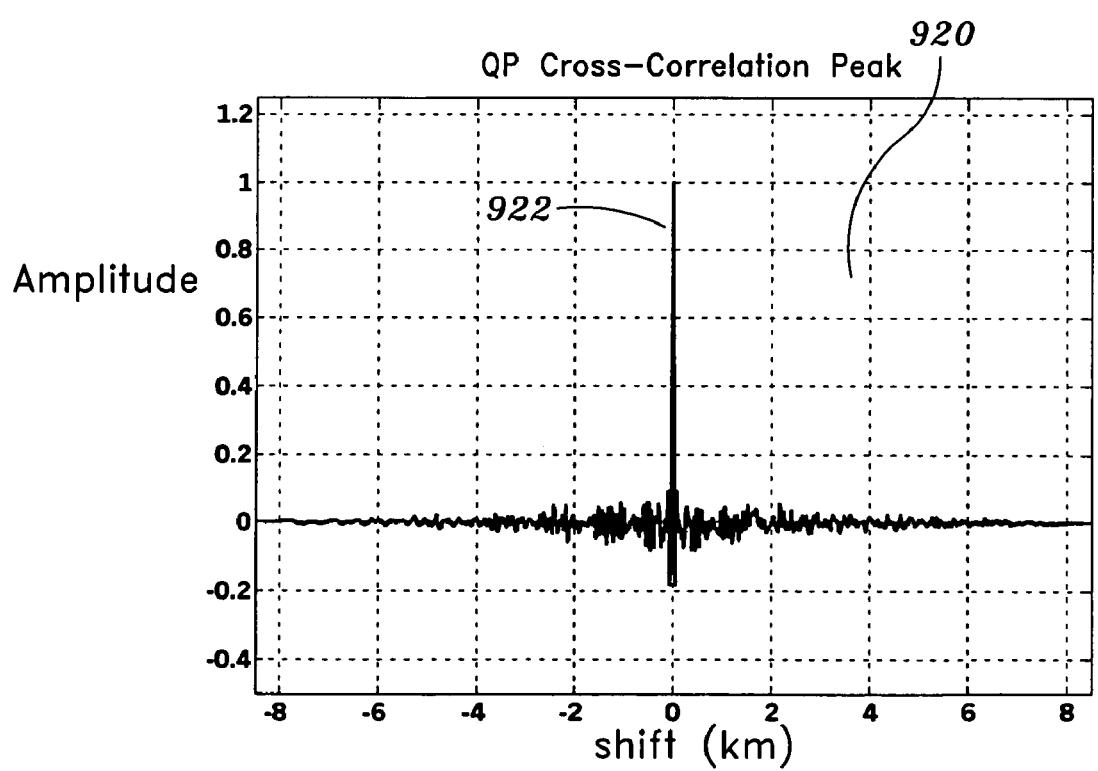
FIG. 9b illustrates the cross-correlation of the reference signal of FIG. 8b with the truncated NTC7 Combination signal.

FIG. 8a shows the multi-burst section of NTC7 Combination signal 800. FIG. 8b shows the corresponding reference signal 810 generated in accordance with the constrained QP optimization technique of the present invention. As shown in FIG. 9a, autocorrelation 900 of NTC7 Combination signal 800 produces prominent sidelobes 910 and 912, in addition to the main peak 914. However, as shown in FIG. 9b, cross-correlation 920 between NTC7 Combination signal 800 and reference signal 810 produces negligible sidelobes and a large main peak 922.

Figure 10A:
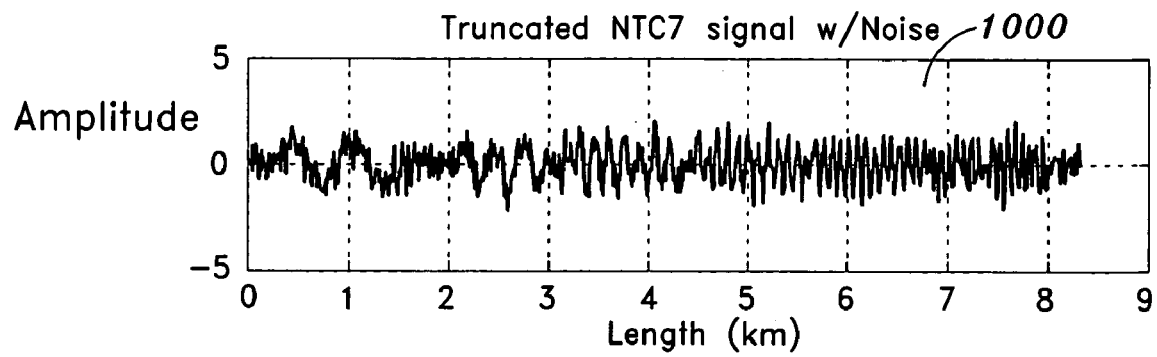
FIG. 10a illustrates a truncated NTC7 Combination signal with noise.
Figure 10B:
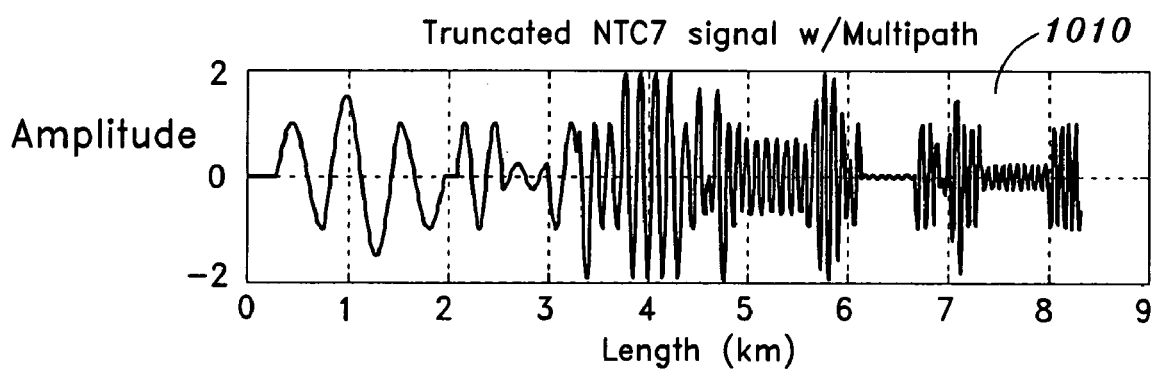
FIG. 10b illustrates a truncated NTC7 Combination signal with multipath reflection.
Figure 10C:
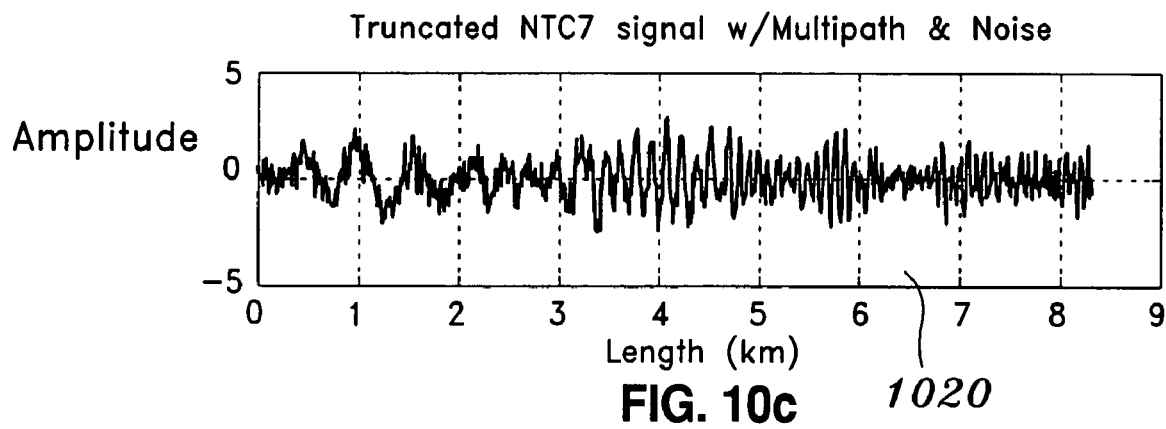
FIG. 10c illustrates a truncated NTC7 Combination signal with noise and multipath reflection.
Figure 11A:
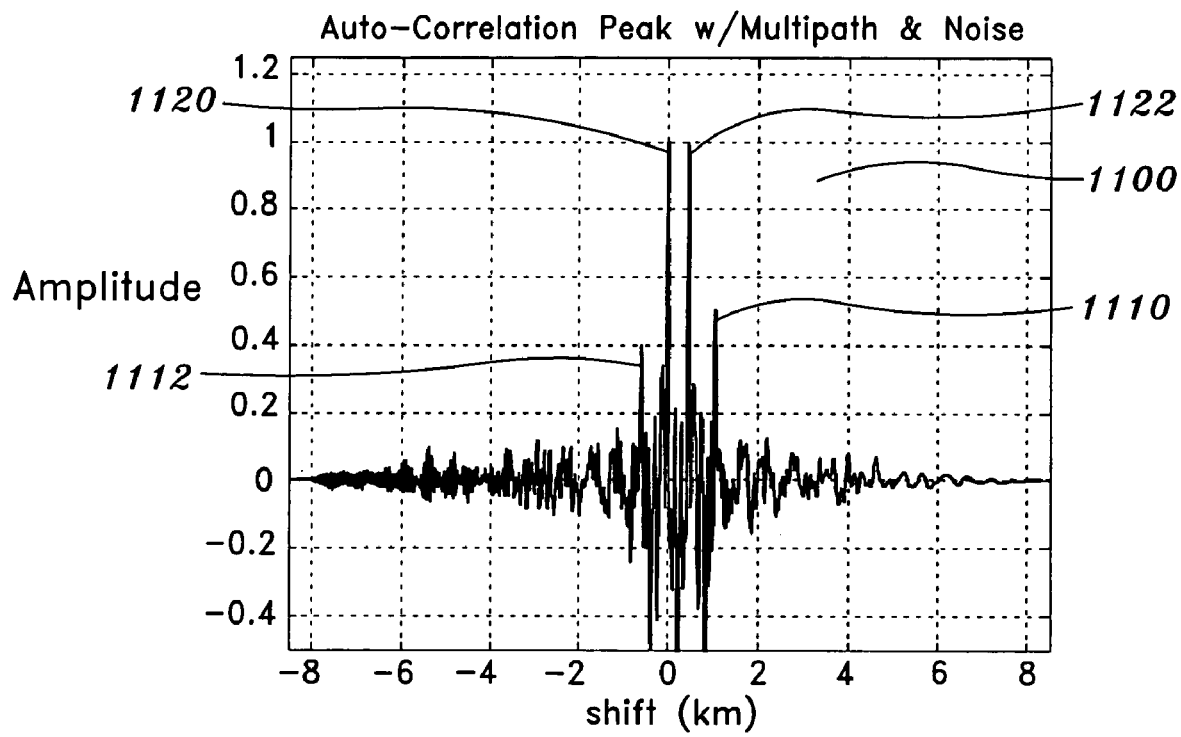
FIG. 11a shows an autocorrelation function for the truncated NTC7 Combination signal with noise and multipath reflection.
Figure 11B:
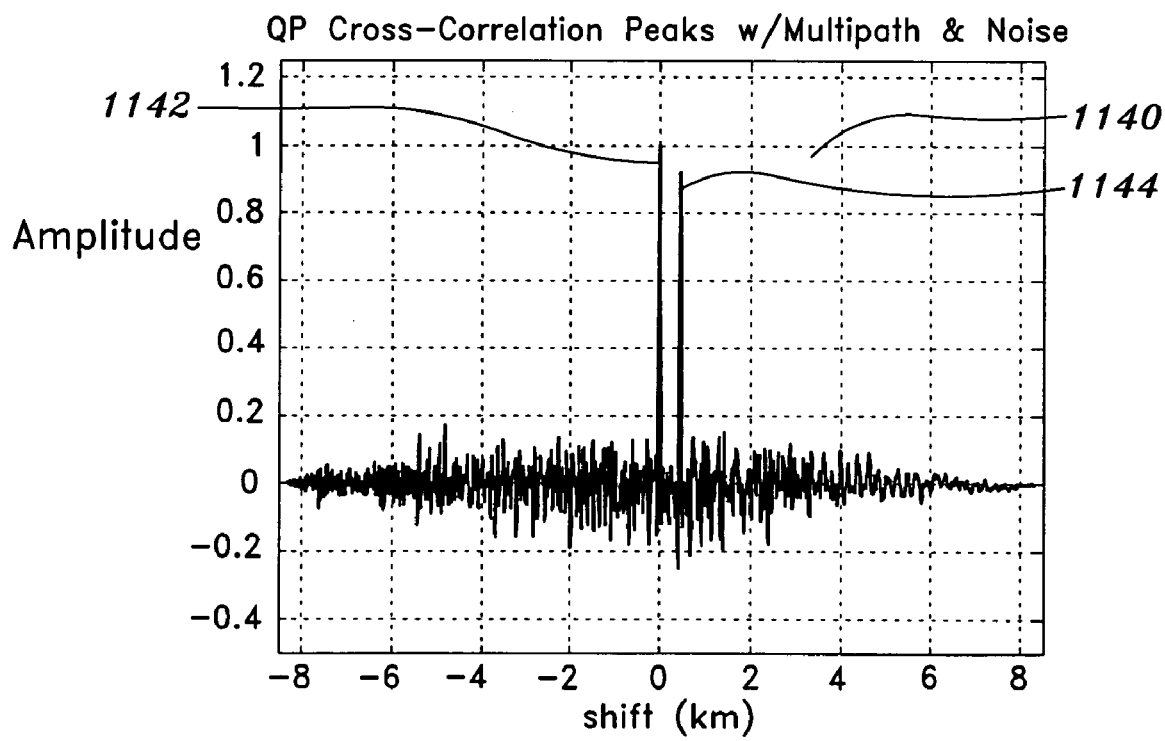
FIG. 11b illustrates the cross-correlation of the reference signal of FIG. 8b with the truncated NTC7 Combination signal with noise and multipath reflection.

FIG. 10a, FIG. 10b, and FIG. 10c show the multi-burst section of NTC7 Combination signal with noise and/or multipath reflection. Shown are: NTC7 Combination signal with additive white Gaussian noise (AWGN) 1000; NTC7 Combination signal with multipath 1010; and NTC7 Combination signal with AWGN and multipath 1020. The noise has a sigma of half the amplitude of the original signal and the multipath had reflection coefficient of 1 and a delay of 40 samples (~462 m). As shown in FIG. 11a, autocorrelation 1100 of NTC7 Combination signal with AWGN and multipath signal 1020 has large sidelobes 1110 and 1112 as well as the main peak 1120 and multipath peak 1122. However, as also shown in FIG. 11b, in cross-correlation 1140 of the same NTC7 signal with reference signal 810, the sidelobes are essentially non-existent while the main peak 1142 and the multipath peak 1144 (at ~462 m) are clearly visible. Moreover, sensitivity of pseudo-range measurement to high frequency noise is negligible due to large size of the peaks compared to noise amplitude.

Figure 12A:
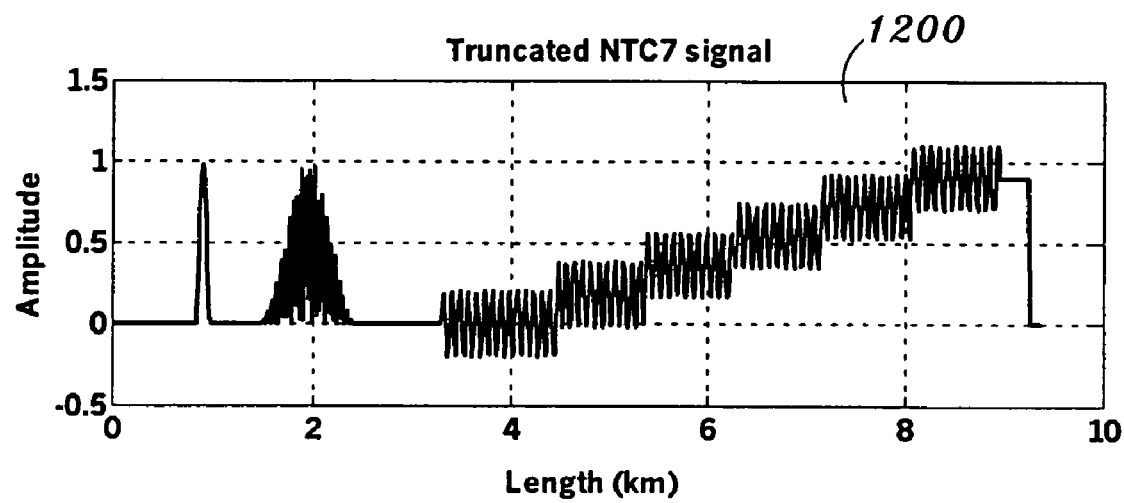
FIG. 12a illustrates a truncated NTC7 Composite signal.
Figure 12B:
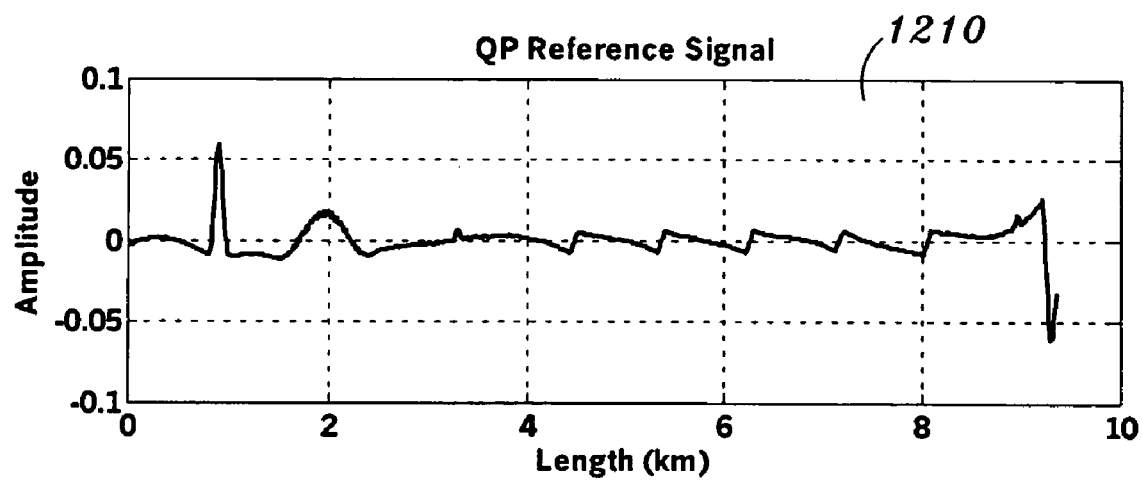
FIG. 12b illustrates a reference signal for the truncated NTC7 Composite signal with improved correlation characteristics for a large correlation main peak, minimized sidelobes, and minimized high and low frequency couplings.
Figure 12C:
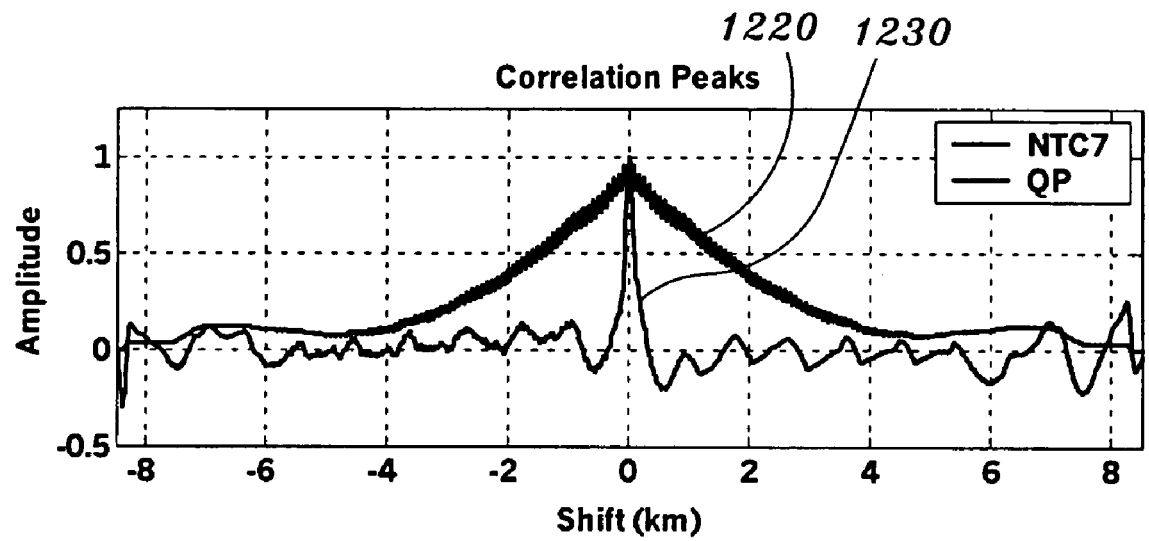
FIG. 12c illustrates an autocorrelation function for the truncated NTC7 Composite signal and the cross-correlation of the reference signal of FIG. 12b with the truncated NTC7 Composite signal.
Figure 12D:
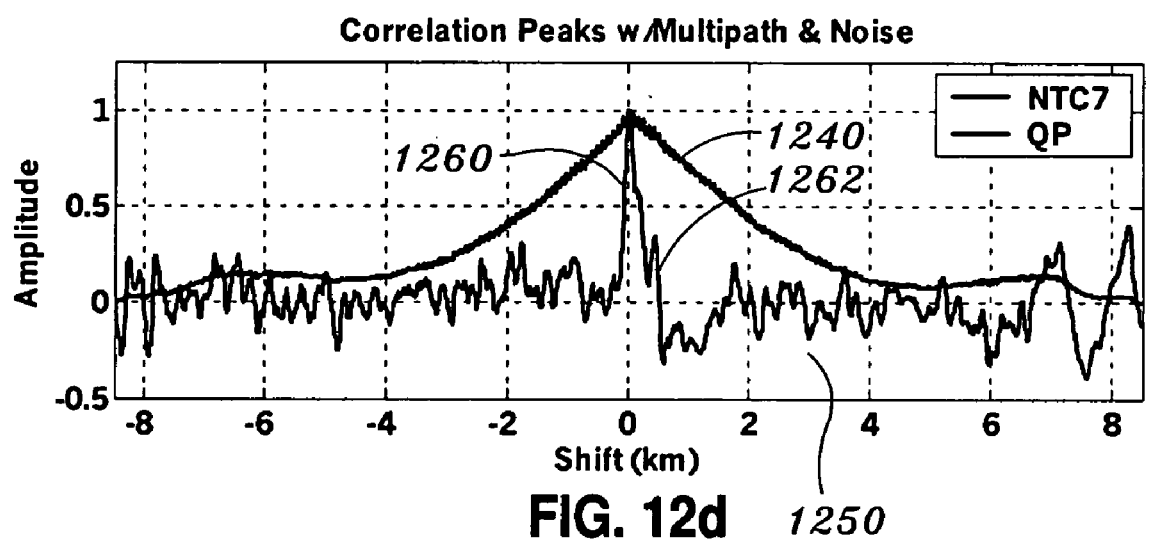
FIG. 12d illustrates an autocorrelation function for the truncated NTC7 Composite signal with noise and multipath reflection, and the cross-correlation of the reference signal of FIG. 12b with the truncated NTC7 Composite signal with noise and multipath reflection.

FIG. 12a illustrates a truncated NTC7 Composite signal, and FIG. 12b illustrates a reference signal for the truncated NTC7 Composite signal with improved correlation characteristics for a large correlation main peak, minimized sidelobes, and minimized high and low frequency couplings. Shown are: NTC7 Composite signal 1200, and corresponding reference signal 1210 generated in accordance with the constrained QP optimization technique of the present invention. As shown in FIG. 12c, autocorrelation 1220 of NTC7 Composite signal 1200 has a wide main peak which is further obfuscated by the color carrier. In contrast, cross-correlation 1230 with reference signal 1210 has a sharp, well-defined, and large main peak. Also shown in FIG. 12d is autocorrelation 1240 of NTC7 Composite signal with noise (AWGN) and multipath. As shown, autocorrelation 1240 not only has ill-defined main peak but also has completely obscured multipath peak. In contrast, cross-correlation 1250 with reference signal 1210 has sharp and smooth main peak 1260 as well as clearly distinguishable multipath peak 1262 at ~462 m.

Figure 13A:
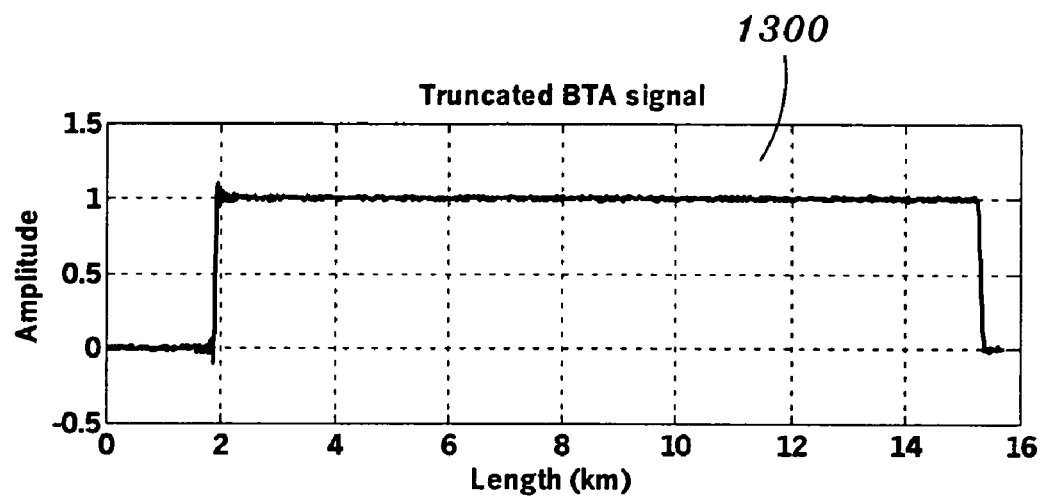
FIG. 13a illustrates a truncated BTA (GCR-A) signal.
Figure 13B:
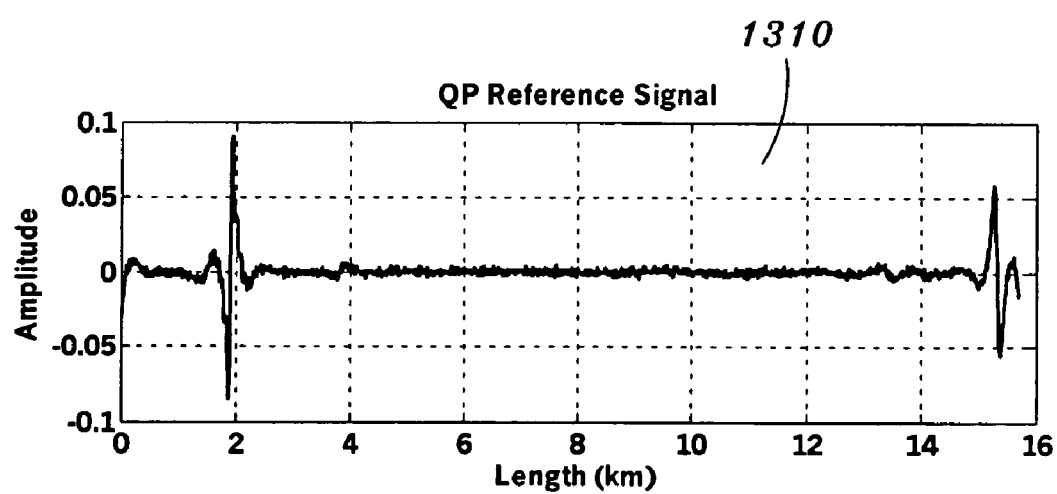
FIG. 13b illustrates a reference signal for the truncated BTA (GCR-A) signal with improved correlation characteristics for a large correlation main peak, minimized sidelobes, and minimized high and low frequency couplings.
Figure 13C:
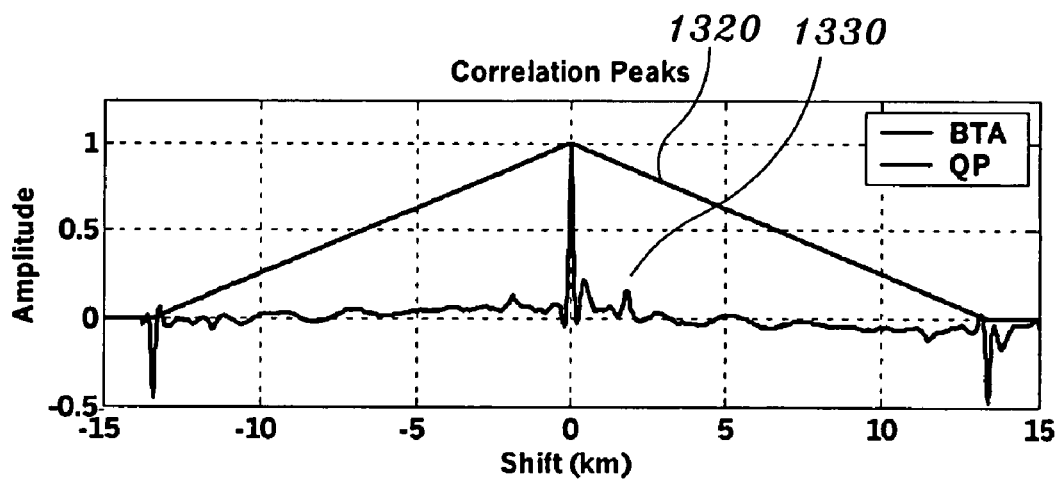
FIG. 13c illustrates an autocorrelation function for the truncated BTA (GCR-A) signal and the cross-correlation of the reference signal of FIG. 13b with the truncated BTA (GCR-A) signal.
Figure 13D:
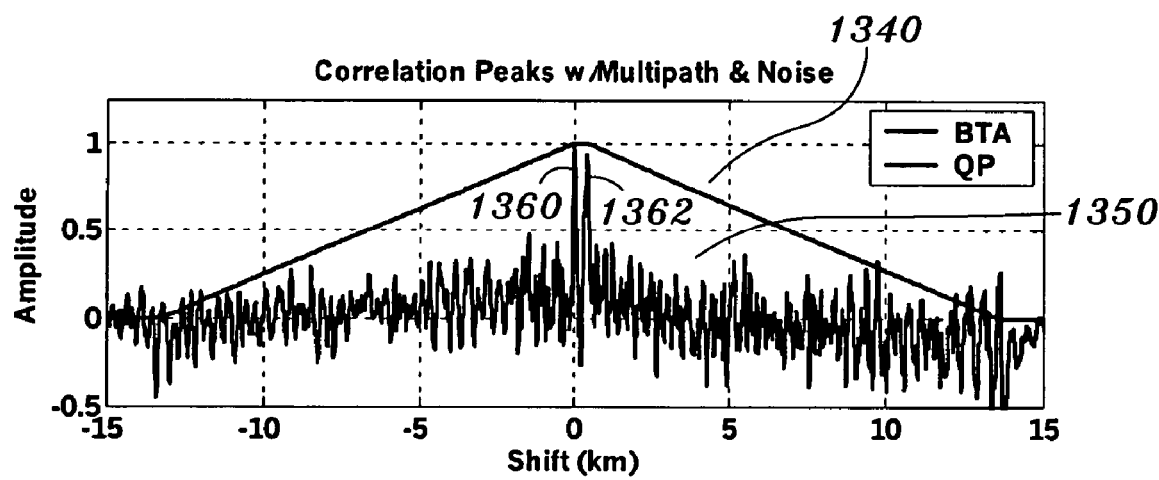
FIG. 13d illustrates an autocorrelation function for the truncated BTA (GCR-A) signal with noise and multipath reflection, and the cross-correlation of the reference signal of FIG. 13b with the truncated BTA (GCR-A) signal with noise and multipath reflection.

FIG. 13a illustrates a truncated BTA (GCR-A) signal. FIG. 13b illustrates a reference signal for the truncated BTA (GCR-A) signal with improved correlation characteristics for a large correlation main peak, minimized sidelobes, and minimized high and low frequency couplings. Shown are: BTA signal 1300 and corresponding reference signal 1310 generated in accordance with the constrained QP optimization technique of the present invention. As shown in FIG. 13c, autocorrelation 1320 of BTA signal 1300 has a wide and ill-defined main peak, whereas cross-correlation 1330 with reference signal 1310 has a sharp, well-defined, and large main peak. Also shown in FIG. 13d is autocorrelation 1340 of BTA signal with noise (AWGN) and multipath. As shown, autocorrelation 1340 not only has ill-defined main peak, but the multipath peak is also indistinguishable. In contrast, cross-correlation 1350 with reference signal 1310 has sharp and smooth main peak 1360 as well as clearly distinguishable multipath peak 1362 at ~462 m.

Figure 14A:
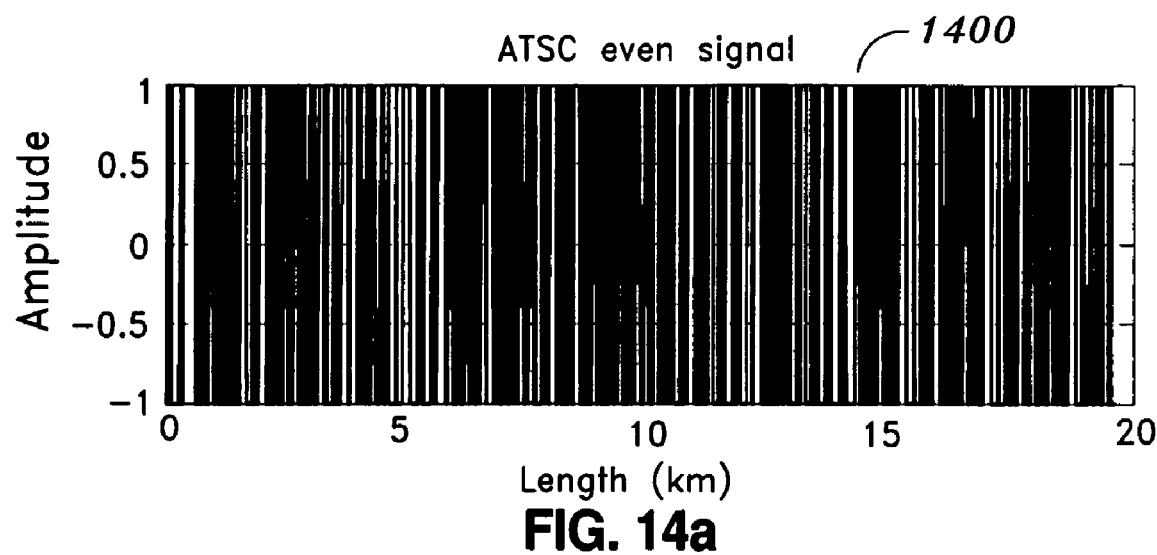
FIG. 14a illustrates an ATSC Even signal.
Figure 14B:
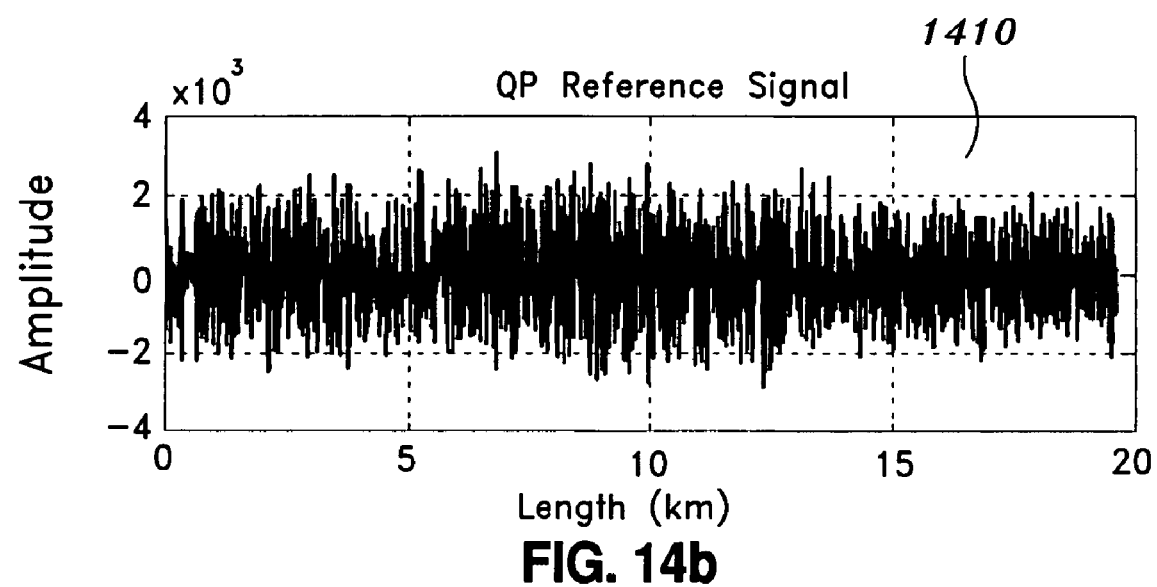
FIG. 14b illustrates a reference signal for the ATSC Even signal with improved correlation characteristics for a large correlation main peak, minimized sidelobes, and minimized high and low frequency couplings.

FIG. 14a illustrates an ATSC Even signal. FIG. 14b illustrates a reference signal for the ATSC Even signal with improved correlation characteristics for a large correlation main peak, minimized sidelobes, and minimized high and low frequency couplings. Shown are: ATSC Field Sync Segment (FSS) signal 1400 and corresponding reference signal 1410 generated in accordance with the constrained QP optimization technique of the present invention. The part of the FSS shown includes the 4 bit segment sync bits, the 511 long PRN sequence and the 3 copies of the 63 long PRN sequence (a total of 704 chips). The middle PN63 has the same polarity as the two others (i.e., even ATSC).

Figure 15A:
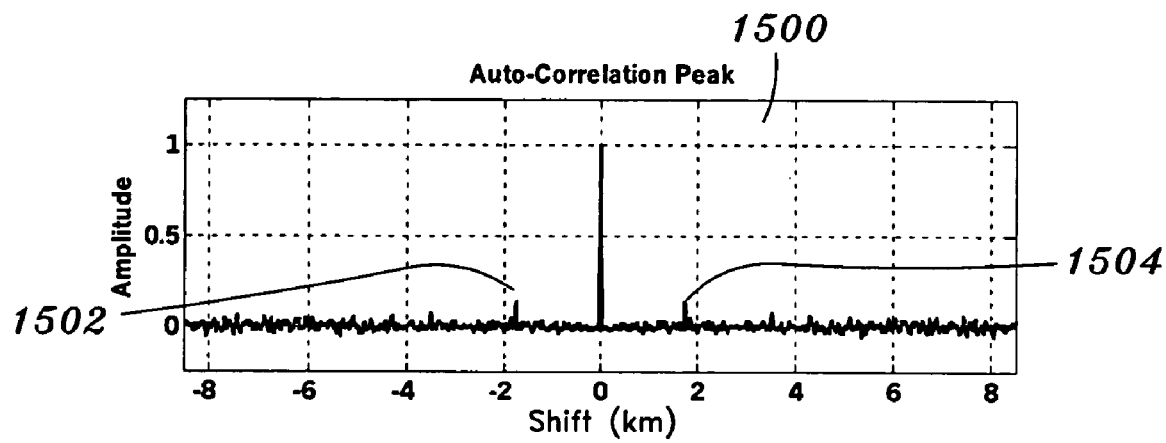
FIG. 15a illustrates an autocorrelation function for the ATSC Even Signal.
Figure 15B:
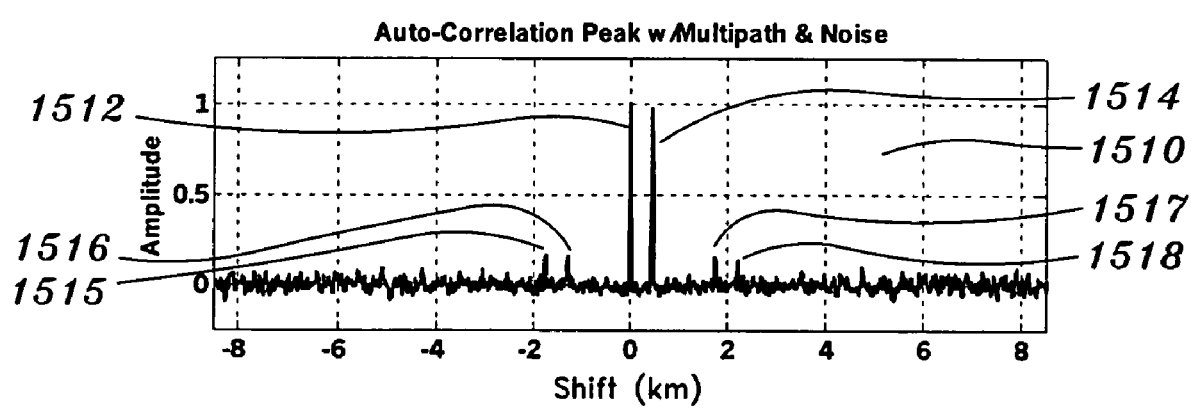
FIG. 15b illustrates an autocorrelation function for the ATSC Even Signal with noise and multipath reflection.
Figure 15C:
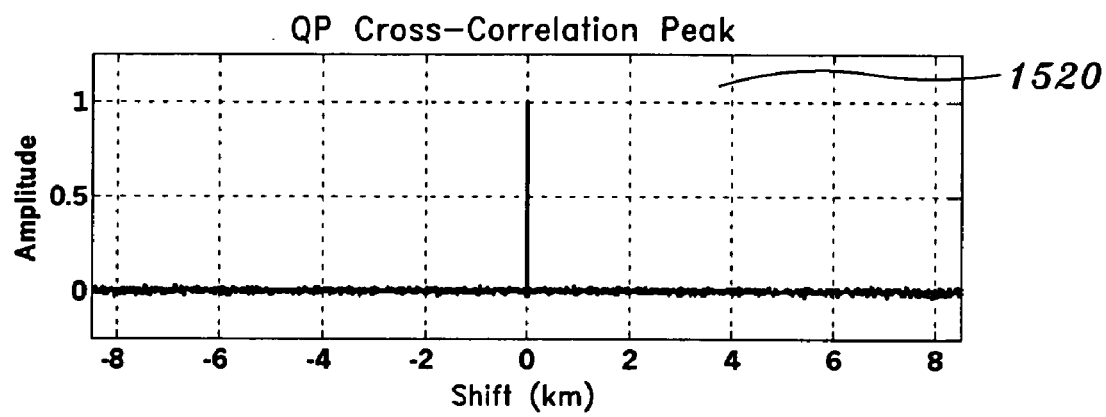
FIG. 15c illustrates the cross-correlation of the reference signal of FIG. 14b with the ATSC Even signal.
Figure 15D:
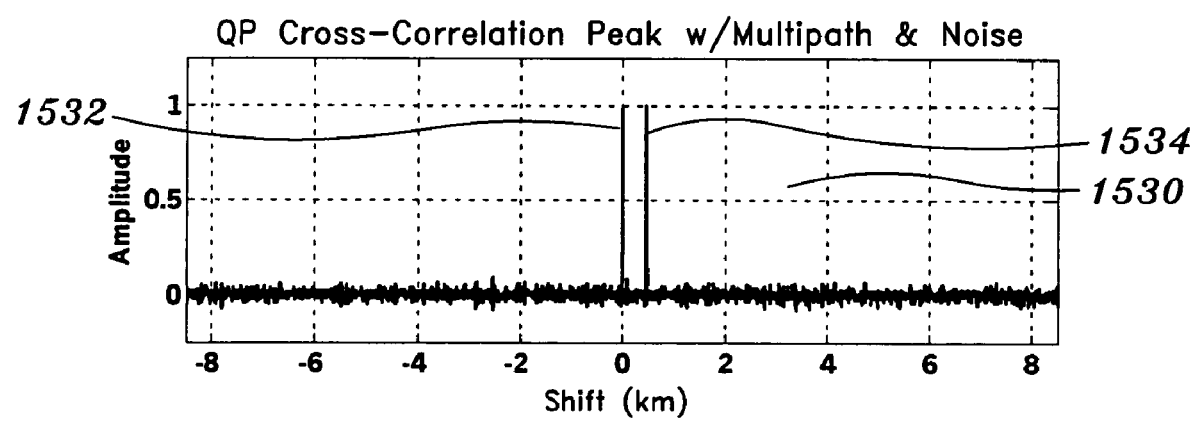
FIG. 15d illustrates the cross-correlation of the reference signal of FIG. 14b with the ATSC Even signal with noise and multipath reflection.

As shown in FIG. 15a, autocorrelation 1500 of ATSC Field Sync Segment (FSS) signal 1400 produces significant sidelobes 1502 and 1504. Also shown in FIG. 15b is autocorrelation 1510 of ATSC Field Sync Segment (FSS) signal 1400 with multipath and noise, producing main peak 1512 and multipath peak 1514 as well as significant sidelobes 1515, 1516, 1517, and 1518 for both peaks. FIG. 15c illustrates the cross-correlation of the reference signal of FIG. 14b with the ATSC Even signal. As shown in FIG. 15c, the sidelobes have practically disappeared in cross-correlation 1520 with reference signal 1410. For ATSC Field Sync Segment (FSS) signal 1400 with multipath and noise, cross-correlation 1530 with reference signal 1410 shows sharp and large main peak 1532 and multipath peak 1534. FIG. 15d illustrates the cross-correlation of the reference signal of FIG. 14b with the ATSC Even signal with noise and multipath reflection. As shown in FIG. 15d, sensitivity of pseudo-range measurement to high frequency noise is negligible due to large size of the peaks compared to noise amplitude.

Figure 16A:
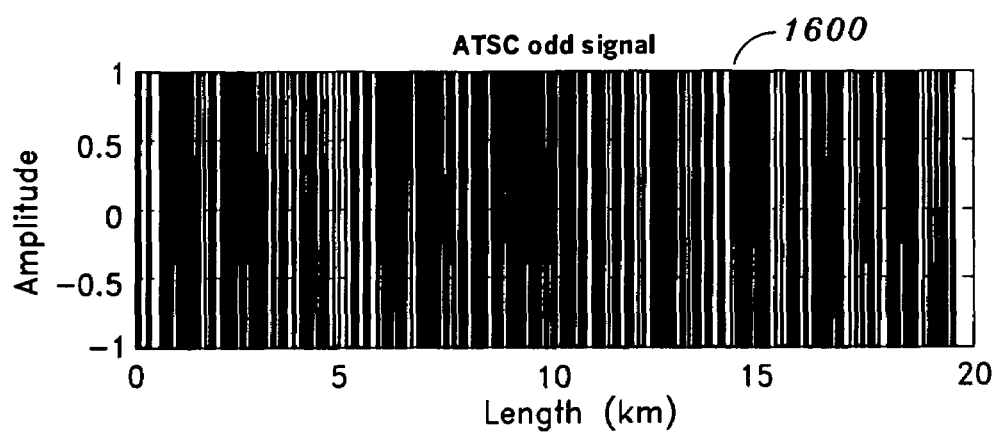
FIG. 16a illustrates an ATSC Odd signal.
Figure 16B:
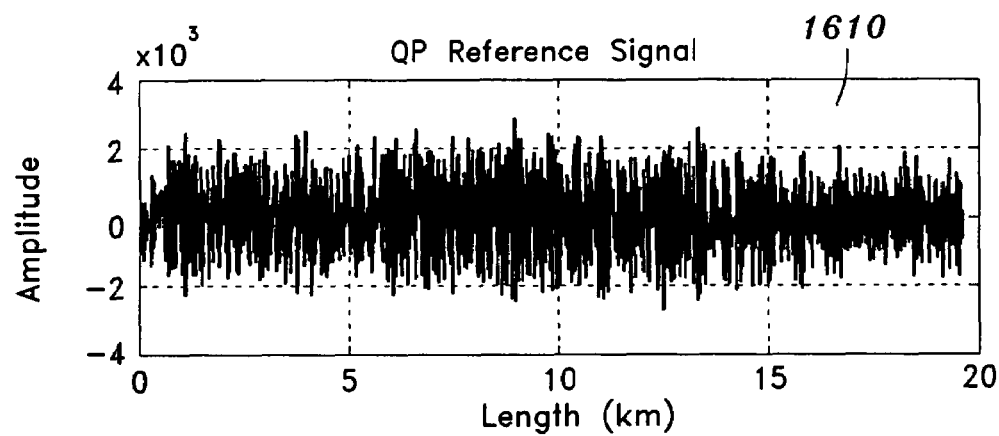
FIG. 16b illustrates a reference signal for the ATSC Odd signal with improved correlation characteristics for a large correlation main peak, minimized sidelobes, and minimized high and low frequency couplings.

FIG. 16a illustrates an ATSC Odd signal. FIG. 16b illustrates a reference signal for the ATSC Odd signal with improved correlation characteristics for a large correlation main peak, minimized sidelobes, and minimized high and low frequency couplings. Shown are: ATSC Field Sync Segment (FSS) signal 1600 and corresponding reference signal 1610 generated in accordance with the constrained QP optimization technique of the present invention. The part of the FSS shown includes the 4 bit segment sync bits, the 511 long PRN sequence and the 3 copies of the 63 long PRN sequence (a total of 704 chips). The middle PN63 has the reverse polarity of the two others (i.e., odd ATSC).

Figure 17A:
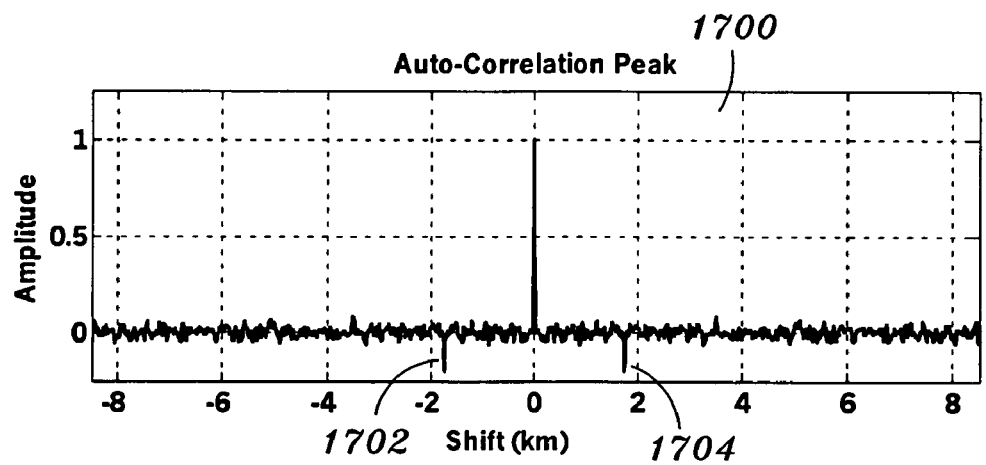
FIG. 17a illustrates an autocorrelation function for the ATSC Odd Signal.
Figure 17B:
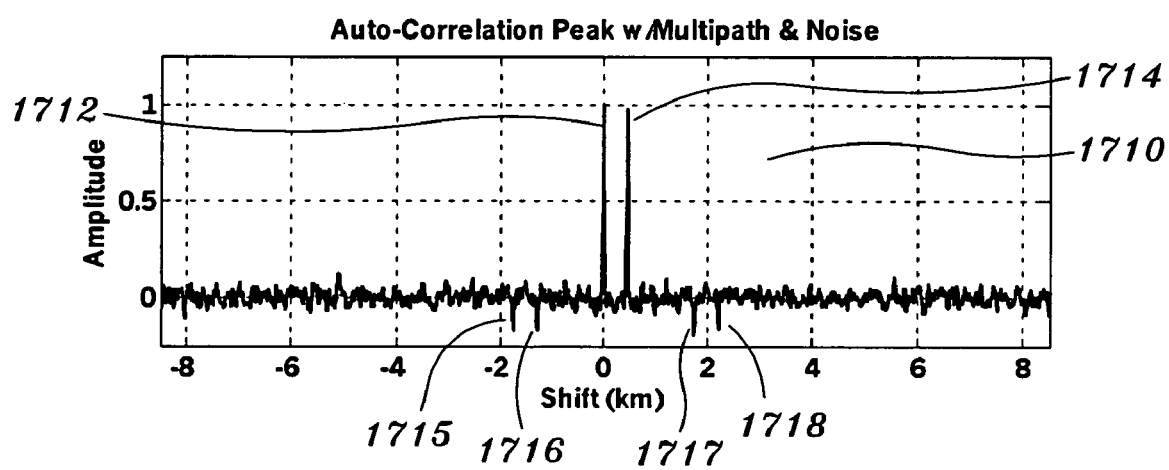
FIG. 17b illustrates an autocorrelation function for the ATSC Odd Signal with noise and multipath reflection.
Figure 17C:
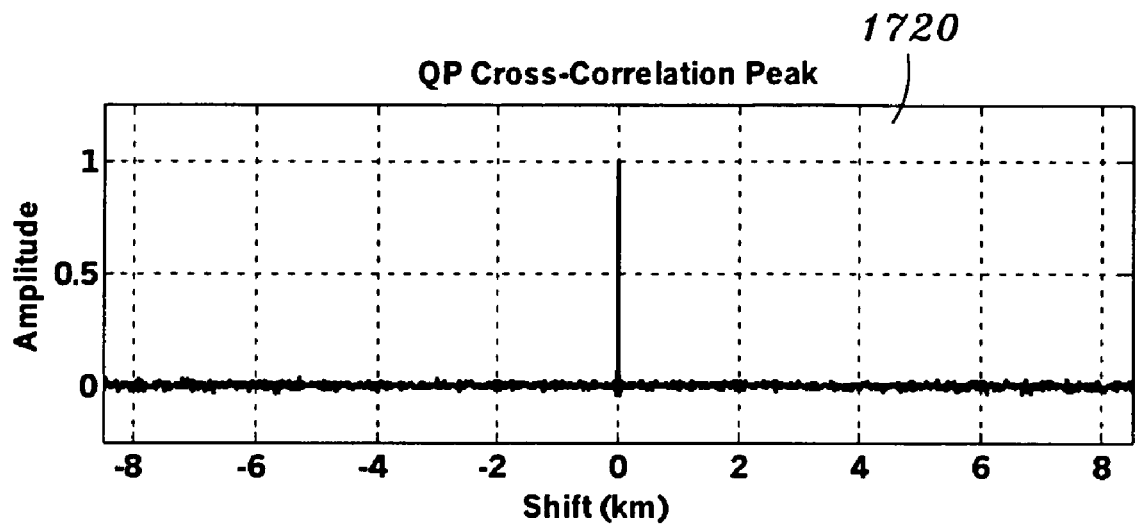
FIG. 17c illustrates the cross-correlation of the reference signal of FIG. 16b with the ATSC Odd signal.
Figure 17D:
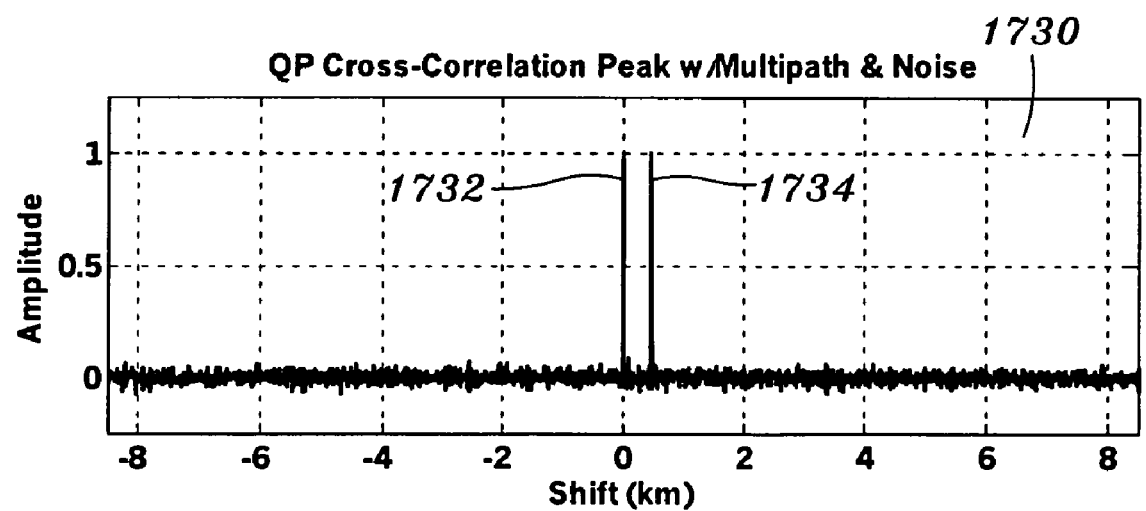
FIG. 17d illustrates the cross-correlation of the reference signal of FIG. 16b with the ATSC Odd signal with noise and multipath reflection.

FIG. 17a illustrates an autocorrelation function for the ATSC Odd Signal. As shown in FIG. 17a, autocorrelation 1700 of ATSC Field Sync Segment (FSS) signal 1400 produces significant sidelobes 1702 and 1704. FIG. 17b illustrates an autocorrelation function for the ATSC Odd Signal with noise and multipath reflection. Shown in FIG. 17b is autocorrelation 1710 of ATSC Field Sync Segment (FSS) signal 1600 with multipath and noise, producing main peak 1712 and multipath peak 1714 as well as sidelobes 1715, 1716, 1717, and 1718 for both peaks. FIG. 17c illustrates the cross-correlation of the reference signal of FIG. 16b with the ATSC Odd signal. As shown in FIG. 17c, the sidelobes have practically disappeared in cross-correlation 1720 with reference signal 1610. For ATSC Field Sync Segment (FSS) signal 1600 with multipath and noise, cross-correlation 1730 with reference signal 1610 shows sharp and large main peak 1732 and multipath peak 1734. FIG. 17d illustrates the cross-correlation of the reference signal of FIG. 16b with the ATSC Odd signal with noise and multipath reflection. As shown in FIG. 17d, sensitivity of pseudo-range measurement to high frequency noise is negligible due to the large size of the peaks compared to noise amplitude.

According to another aspect of the invention, the present invention is a system for generating a reference signal with improved correlation characteristics such that correlation with a known component of broadcast TV signals produces reduced sidelobes while producing large main peaks and at the same time limiting couplings to low frequency disturbance signal and high frequency noise. The system of the present invention comprises: a computer with a display monitor, one or more input devices for processing operator inputs; and a storage device connected to the computer for storing data. The computer processes a command input from one or more input devices for 1) defining a known component of a broadcast television signal, 2) defining an autocorrelation matrix for the known component of the broadcast television signal, 3) generating an autocorrelation function of the known component of the broadcast television signal, 4) identifying sidelobes in the autocorrelation function of the known component of the broadcast television signal, 5) defining a sidelobe producing matrix which produces only the identified sidelobes when applied to the known component of the broadcast television signal, and finding a reference signal which (a) minimizes a product of the sidelobe-producing matrix and the reference signal, (b) minimizes sensitivity to high frequency noise when cross-correlated with the known component of the broadcast television signal, (c) minimizes sensitivity to low frequency disturbance signals when cross correlated with the known component of the broadcast television signal, and (d) maximizes a main peak when cross-correlated with the known component of the broadcast television signal.

The computer of the present invention can be any computing device including a desktop PC, a laptop or notebook PC, a workstation, a server, a mainframe, or a supercomputer without departing from the scope of the present invention. The computer has sufficient computing power, memory, and storage spaces to perform various optimization processing of the present invention within a reasonable length of time. The computer of the present invention can comprise more than one computer or computing units without departing from the scope of the present invention. The optimizations to generate the reference signals with improved correlation characteristics can be performed on the computer by employing packages or libraries known to one skilled in the art such as, but not limited to, MATLAB, MathCAD, or Mathematica. The optimizations can also be accomplished by utilizing a customized application without departing from the scope of the present invention. Such applications can be written in C, C++, FORTRAN or any other computer programming language known to one skilled in the art without departing from the scope of the present invention.

According to yet another aspect of the present invention, the present invention is computer-executable process steps for generating a reference signal with improved correlation characteristics, wherein the process steps are stored on a computer-readable medium, the steps comprising: a step for defining a known component of a broadcast television signal; a step for defining an autocorrelation matrix for the known component of the broadcast television signal; a step for generating an autocorrelation function of the known component of the broadcast television signal; a step for identifying sidelobes in the autocorrelation function of the known component of the broadcast television signal; a step for defining a sidelobe producing matrix which produces only the identified sidelobes when applied to the known component of the broadcast television signal; and a step for finding a reference signal which (1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal.

Computer-executable process steps of the present invention can be executed on any computer including PCs, workstations, servers, mainframes, and supercomputers without departing from the scope of the present invention. The computer can have any type of CPUs, including Intel CPU, a PowerPC CPU, a MIPS RISC CPU, a SPARC CPU, a Alpha CPU or a proprietary CPU for a mainframe or supercomputer, without departing from the scope of the present invention. The computer-readable medium can be any data storage medium including magnetic disk and tape media, optical media, and magneto-optical media without departing from the scope of the present invention. The computer-readable medium can also be a ROM or flash ROM for firmware. The computer-executable process steps of the present invention can also be executed by a dedicated and/or specialized digital and/or analog circuits without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for generating a reference signal with improved correlation characteristics, comprising:
   defining a known component of a broadcast television signal;
   defining an autocorrelation matrix for the known component of the broadcast television signal, the autocorrelation matrix defined using time-shifted versions of the known component of the broadcast television signal;
   generating an autocorrelation function of the known component of the broadcast television signal, the autocorrelation function generated based on the autocorrelation matrix and the known component of the broadcast television signal;
   identifying sidelobes in the autocorrelation function of the known component of the broadcast television signal;
   defining a sidelobe-producing matrix, the sidelobe-producing matrix for producing only the identified sidelobes when applied to the known component of the broadcast television signal; and
   finding a reference signal which minimizes a product of the sidelobe-producing matrix and the reference signal.

2. The method of claim 1, wherein the reference signal also minimizes sensitivity to high frequency noise when cross-correlated with the known component of the broadcast television signal.

3. The method of claim 1, wherein the reference signal also minimizes sensitivity to low frequency disturbance signals when cross-correlated with the known component of the broadcast television signal.

4. The method of claim 1, wherein the reference signal also maximizes a main peak when cross-correlated with the known component of the broadcast television signal.

5. The method of claim 1, wherein a Quadratic Programming (QP) approach is utilized to find the reference signal.

6. The method of claim 1, wherein the broadcast television signal is an American Television Standards Committee (ATSC) digital television signal, and the known component of the broadcast television signal is a known digital sequence in the ATSC frame.

7. The method of claim 6, wherein the known digital sequence is a synchronization code.

8. The method of claim 7, wherein the synchronization code is a Field Synchronization Segment within an ATSC data frame.

9. The method of claim 7, wherein the synchronization code is a Synchronization Segment within a Data Segment within an ATSC data frame.

10. The method of claim 1, wherein the broadcast television signal is an European Telecommunications Standards Institute (ETSI) Digital Video Broadcasting-Terrestrial (DVB-T) signal.

11. The method of claim 10, wherein the known component of the broadcast television signal is a scattered pilot carrier.

12. The method of claim 1, wherein the broadcast television signal is a Japanese Integrated Services Digital Broadcasting-Terrestrial (ISDB-T) signal.

13. The method of claim 1, wherein the broadcast television signal is an analog television signal.

14. The method of claim 13, wherein the known component of the broadcast television signal is selected from the group comprising:
   a horizontal synchronization pulse;
   a horizontal blanking pulse;
   a horizontal blanking pulse and a horizontal synchronization pulse;
   a ghost canceling reference signal; and
   a vertical interval test signal.

15. The method of claim 2, wherein the reference signal also minimizes sensitivity to low frequency disturbance signals when cross-correlated with the known component of the broadcast television signal.

16. A method for generating a reference signal with improved correlation characteristics, comprising:
   defining a known component of a broadcast television signal;
   defining an autocorrelation matrix for the known component of the broadcast television signal, the autocorrelation matrix defined using time-shifted versions of the known component of the broadcast television signal;
   generating an autocorrelation function of the known component of the broadcast television signal, the autocorrelation function generated based on the autocorrelation matrix and the known component of the broadcast television signal;

identifying sidelobes in the autocorrelation function of the known component of the broadcast television signal;

defining a sidelobe-producing matrix, the sidelobe-producing matrix for producing only the identified sidelobes when applied to the known component of the broadcast television signal; and finding a reference signal which:
(1) minimizes a product of the sidelobe-producing matrix and the reference signal,
(2) minimizes sensitivity to high frequency noise when cross-correlated with the known component of the broadcast television signal,
(3) minimizes sensitivity to low frequency disturbance signals when cross-correlated with the known component of the broadcast television signal, and
(4) maximizes a main peak when cross-correlated with the known component of the broadcast television signal.

17. The method of claim 16, wherein a Quadratic Programming (QP) approach is utilized to find the reference signal.

18. The method of claim 16, wherein one or more reference signals are generated for a known component of a broadcast television signal by applying one or more relative weighting factors to at least two conditions for finding the one or more reference signals, wherein the conditions include: minimizing a product of the sidelobe-producing matrix and the reference signal, minimizing sensitivity to high frequency noise in cross-correlation of the reference signal and the known component of the broadcast television signal, minimizing sensitivity to low frequency disturbance signals in cross-correlation of the reference signal and the known component of the broadcast television signal, and maximizing a main peak in cross-correlation of the reference signal and the known component of the broadcast television signal.

19. The method of claim 16, wherein the broadcast television signal is an American Television Standards Committee (ATSC) digital television signal, and the known component in the broadcast television signal is a known digital sequence in the ATSC frame.

20. The method of claim 19, wherein the known digital sequence is a synchronization code.

21. The method of claim 20, wherein the synchronization code is a Field Synchronization Segment within an ATSC data frame.

22. The method of claim 20, wherein the synchronization code is a Synchronization Segment within a Data Segment within an ATSC data frame.

23. The method of claim 16, wherein the broadcast television signal is an European Telecommunications Standards Institute (ETSI) Digital Video Broadcasting-Terrestrial (DVB-T) signal.

24. The method of claim 23, wherein the known component in the broadcast television signal is a scattered pilot carrier.

25. The method of claim 16, wherein the broadcast television signals is a Japanese Integrated Services Digital Broadcasting-Terrestrial (ISDB-T) signal.

26. The method of claim 16, wherein the broadcast television signal is an analog television signal.

27. The method of claim 26, wherein the known component of the broadcast television signal is selected from the group comprising:
a horizontal synchronization pulse;
a horizontal blanking pulse;
a horizontal blanking pulse and a horizontal synchronization pulse;
a ghost canceling reference signal; and
a vertical interval test signal.

28. A system for generating a reference signal with improved correlation characteristics, comprising:
a computer with a display monitor;
one or more input devices for processing operator inputs; and
a storage device connected to the computer for storing data,
wherein the computer is configured to process a command input from one or more input devices for 1) defining a known component of a broadcast television signal, 2) defining an autocorrelation matrix for the known component of the broadcast television signal, the autocorrelation matrix defined using time-shifted versions of the known component of the broadcast television signal, 3) generating an autocorrelation function of the known component of the broadcast television signal, the autocorrelation function generated based on the autocorrelation matrix and the known component of the broadcast television signal, 4) identifying sidelobes in the autocorrelation function of the known component of the broadcast television signal, 5) defining a sidelobe-producing matrix, the sidelobe-producing-matrix for producing only the identified sidelobes when applied to the known component of the broadcast television signal, and finding a reference signal which (a) minimizes a product of the sidelobe-producing matrix and the reference signal, (b) minimizes sensitivity to high frequency noise when cross-correlated with the known component of the broadcast television signal, (c) minimizes sensitivity to low frequency disturbance signals when cross correlated with the known component of the broadcast television signal, and (d) maximizes a main peak when cross-correlated with the known component of the broadcast television signal.

29. The system of claim 28, wherein the broadcast television signal is an American Television Standards Committee (ATSC) digital television signal, and the known component in the broadcast television signal is a known digital sequence in the ATSC frame.

30. The system of claim 29, wherein the known digital sequence is a synchronization code.

31. The system of claim 30, wherein the synchronization code is a Field Synchronization Segment within an ATSC data frame.

32. The system of claim 30, wherein the synchronization code is a Synchronization Segment within a Data Segment within an ATSC data frame.

33. The system of claim 28, wherein the broadcast television signal is an European Telecommunications Standards Institute (ETSI) Digital Video Broadcasting-Terrestrial (DVB-T) signal.

34. The system of claim 33, wherein the known component in the broadcast television signals is a scattered pilot carrier.

35. The system of claim 28, wherein the broadcast television signals is a Japanese Integrated Services Digital Broadcasting-Terrestrial (ISDB-T) signal.

36. The system of claim 28, wherein the broadcast television signal is an analog television signal.

37. The system of claim 36, wherein the known component of the broadcast television signal is selected from the group comprising:
a horizontal synchronization pulse;
a horizontal blanking pulse;
a horizontal blanking pulse and a horizontal synchronization pulse;

a ghost canceling reference signal; and a vertical interval test signal.

38. The system of claim 28, wherein a Quadratic Programming (QP) approach is utilized to find the reference signal.

39. Computer-executable process steps for generating a reference signal with improved correlation characteristics, wherein the process steps are stored on a computer-readable medium, the steps comprising:

defining a known component of a broadcast television signal;

defining an autocorrelation matrix for the known component of the broadcast television signal, the autocorrelation matrix defined using time-shifted versions of the known component of the broadcast television signal;

generating an autocorrelation function of the known component of the broadcast television signal, the autocorrelation function generated based on the autocorrelation matrix and the known component of the broadcast television signal;

identifying sidelobes in the autocorrelation function of the known component of the broadcast television signal;

defining a sidelobe-producing matrix, the sidelobe-producing matrix for producing only the identified sidelobes when applied to the known component of the broadcast television signal; and finding a reference signal which:

(1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal.

40. The computer-executable process steps of claim 39, wherein the autocorrelation matrix is defined by populating rows of the autocorrelation matrix with time-shifted versions of the known component of the broadcast television signal.

41. A system for generating a reference signal with improved correlation characteristics, comprising:

means for defining a known component of a broadcast television signal;

means for defining an autocorrelation matrix for the known component of the broadcast television signal, the autocorrelation matrix defined using time-shifted versions of the known component of the broadcast television signal;

means for generating an autocorrelation function of the known component of the broadcast television signal, the autocorrelation function generated based on the autocorrelation matrix and the known component of the broadcast television signal;

means for identifying sidelobes in the autocorrelation function of the known component of the broadcast television signal;

means for defining a sidelobe-producing matrix, the sidelobe-producing matrix for producing only the identified sidelobes when applied to the known component of the broadcast television signal; and means for finding a reference signal which:

(1) minimizes a product of the sidelobe-producing matrix and the reference signal, (2) minimizes sensitivity to high frequency noise when cross-correlated with the known component of the broadcast television signal, (3) minimizes sensitivity to low frequency disturbance signals when cross correlated with the known component of the broadcast television signal, and (4) maximizes a main peak when cross-correlated with the known component of the broadcast television signal.

* * * * *

UNITED STATES PATENT AND TRADEMARK OFFICE
CERTIFICATE OF CORRECTION

PATENT NO. : 7,307,665 B2 Page 1 of 1
APPLICATION NO. : 10/740881
DATED : December 11, 2007
INVENTOR(S) : Guttorm Ringstad Opshaug et al.

It is certified that error appears in the above-identified patent and that said Letters Patent is hereby corrected as shown below:

IN THE SPECIFICATION:

In column 10, line 44, "$s^T=[1-11]$," should read --$s^T=[1 -1 1]$,--.

IN THE DRAWINGS:

In Figure 14b, in the Y axis, "$x10^3$" should read --$x10^{-3}$--.

In Figure 16b, in the Y axis, "$x10^3$" should read --$x10^{-3}$--.

Signed and Sealed this

Seventh Day of October, 2008

JON W. DUDAS
*Director of the United States Patent and Trademark Office*